US006876376B2

(12) United States Patent
Sasaki

(10) Patent No.: US 6,876,376 B2
(45) Date of Patent: Apr. 5, 2005

(54) RECORDING APPARATUS AND RECORDING METHOD

(75) Inventor: Yoshiharu Sasaki, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 134 days.

(21) Appl. No.: 10/180,306

(22) Filed: Jun. 27, 2002

(65) Prior Publication Data

US 2003/0007778 A1 Jan. 9, 2003

(30) Foreign Application Priority Data

Jul. 4, 2001 (JP) ..................................... P.2001-203642
Jul. 13, 2001 (JP) ..................................... P.2001-213478
Jul. 13, 2001 (JP) ..................................... P. 2001-213479

(51) Int. Cl.[7] .............................. B41J 2/485; B41J 2/51
(52) U.S. Cl. ........................................................ 347/225
(58) Field of Search ................................ 347/224, 225, 347/232, 233, 171, 172, 174, 176; 346/138

(56) References Cited

U.S. PATENT DOCUMENTS 5,578,824 A * 11/1996 Koguchi et al. ............ 250/318

FOREIGN PATENT DOCUMENTS

| | | |
|---|---|---|
| JP | 4-296594 | 10/1992 |
| JP | 4-327982 | 11/1992 |
| JP | 4-327983 | 11/1992 |
| JP | 7-290731 | 11/1995 |
| JP | 11-277831 | 10/1999 |

* cited by examiner

*Primary Examiner*—Huan Tran
(74) *Attorney, Agent, or Firm*—Sughrue Mion, PLLC

(57) ABSTRACT

In a recording apparatus, a recording medium is fixed to a recording medium fixing member. To record a desired image, the recording medium is exposed to light containing image/character data, while the recording medium is moved in the main scan direction, and a plurality of spots arrayed on the recording medium are moved in a direction orthogonal to the main scan direction. In the recording apparatus, first and second exposure operations are performed. In the first exposure operation, the recording medium is exposed to the light containing image/character data, while forming pixel groups or island patterns each consisting of a predetermined number of pixels consecutively arrayed on the recording medium in the main and sub-scan directions. In a second exposure operation and the subsequent ones, the pixels in an unexposed area other than the island patterns on the recording medium are successively exposed to the light.

11 Claims, 27 Drawing Sheets

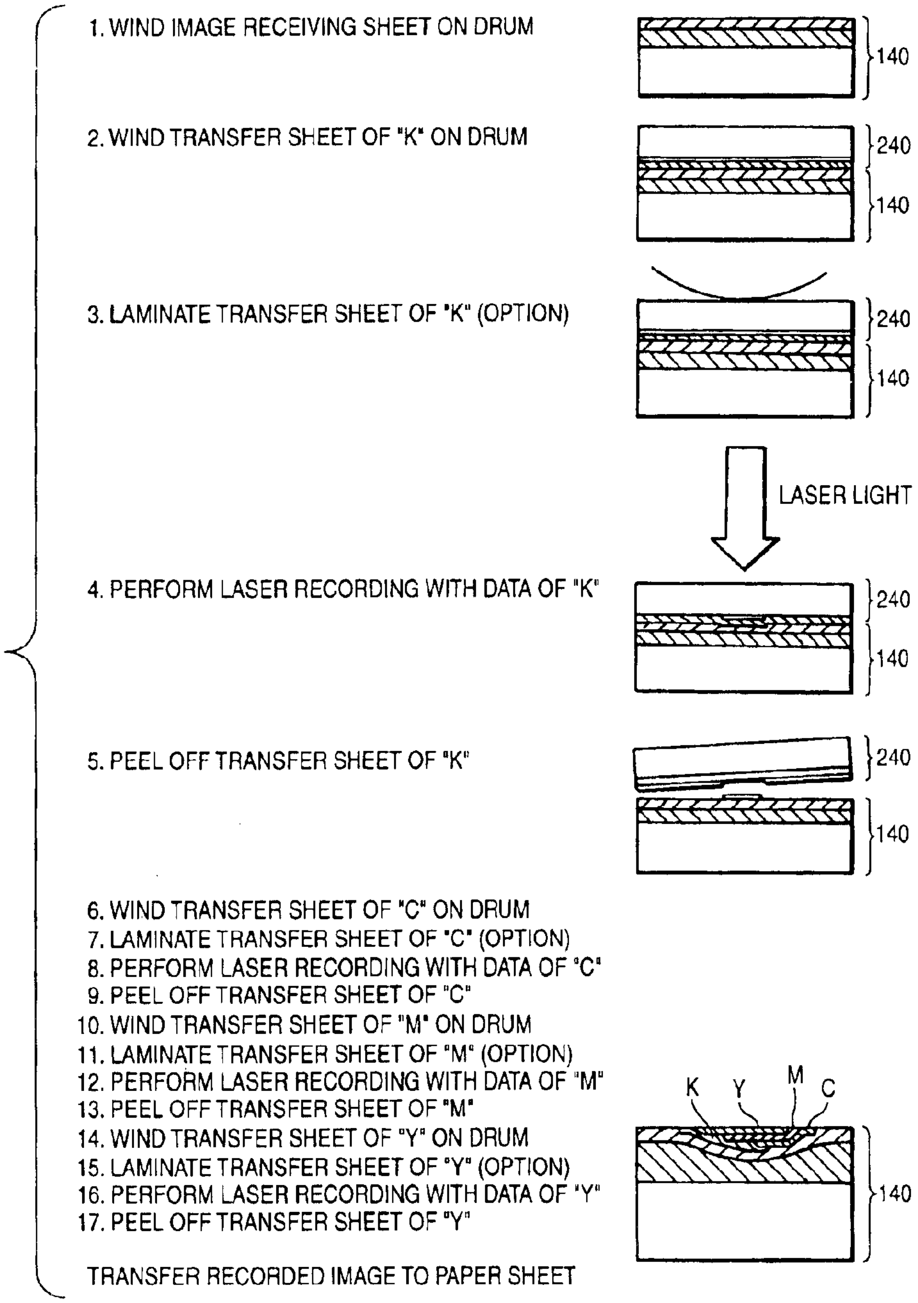

FIG. 4

1. WIND IMAGE RECEIVING SHEET ON DRUM }140

2. WIND TRANSFER SHEET OF "K" ON DRUM }240 }140

3. LAMINATE TRANSFER SHEET OF "K" (OPTION) }240 }140

LASER LIGHT

4. PERFORM LASER RECORDING WITH DATA OF "K" }240 }140

5. PEEL OFF TRANSFER SHEET OF "K" }240 }140

6. WIND TRANSFER SHEET OF "C" ON DRUM
7. LAMINATE TRANSFER SHEET OF "C" (OPTION)
8. PERFORM LASER RECORDING WITH DATA OF "C"
9. PEEL OFF TRANSFER SHEET OF "C"
10. WIND TRANSFER SHEET OF "M" ON DRUM
11. LAMINATE TRANSFER SHEET OF "M" (OPTION)
12. PERFORM LASER RECORDING WITH DATA OF "M"
13. PEEL OFF TRANSFER SHEET OF "M"
14. WIND TRANSFER SHEET OF "Y" ON DRUM
15. LAMINATE TRANSFER SHEET OF "Y" (OPTION)
16. PERFORM LASER RECORDING WITH DATA OF "Y"
17. PEEL OFF TRANSFER SHEET OF "Y"
TRANSFER RECORDED IMAGE TO PAPER SHEET

K Y M C

}140

*FIG. 16 (a)*   AT m-TH ROTATION OF DRUM

```
111    111
111    111
 111    111
  111    111
1   111    11
11   111    1
111   111
 111   111
  111   111
   111   111
1   111    11
11   111    1
111   111
 111   111
  111   111
   111   111
1   111    11
11   111    1
111   111
 111   111
  111   111
   111   111
1   111    11
1,  111    1
```

*FIG. 16 (b)*   AT (m+1)-TH ROTATION OF DRUM

```
1112221112 22   222    222
21112221112 22   222    22
221112221112 22   222    2
2221112221112 22   222
12221112221  222   222
112221112221 222   222
1112221112 22   222    222
21112221112 22   222    22
221112221112 22   222    2
2221112221112 22   222
12221112221  222   222
112221112221 222   222
1112221112 22   222    222
21112221112 22   222    22
221112221112 22   222    2
2221112221112 22   222
12221112221  222   222
112221112221 222   222
1112221112 22   222    222
21112221112 22   222    22
221112221112 22   222    2
2221112221112 22   222
12221112221  222   222
112221112221 222   222
```

*FIG. 16 (c)*   AT (m+2)-TH ROTATION OF DRUM

```
11122211122233322233322233  333
21112221112223332223332  333   333
2211122211122233322233322  333   333
22211122211122233322233  333   333
12221112221132223332233  333    33
1122211122213322233322233  333    3
11122211122233322233322233  333
21112221112223332223332  333   333
2211122211122233322233322  333   333
22211122211122233322233  333   333
12221112221132223332233  333    33
1122211122213322233322233  333    3
11122211122233322233322233  333
21112221112223332223332  333   333
2211122211122233322233322  333   333
22211122211122233322233  333   333
12221112221132223332233  333    33
1122211122213322233322233  333    3
11122211122233322233322233  333
21112221112223332223332  333   333
2211122211122233322233322  333   333
22211122211122233322233  333   333
12221112221132223332233  333    33
1122211122213322233322233  333    3
```

AT (m+3)-TH ROTATION OF DRUM

AT (m+4)-TH ROTATION OF DRUM

AT (m+5)-TH ROTATION OF DRUM

AT m-TH ROTATION OF DRUM

AT (m+1)-TH ROTATION OF DRUM

AT (m+2)-TH ROTATION OF DRUM

AT (m+3)-TH ROTATION OF DRUM

AT (m+4)-TH ROTATION OF DRUM

AT (m+5)-TH ROTATION OF DRUM

AT m-TH ROTATION OF DRUM

AT (m+1)-TH ROTATION OF DRUM
RECORD SECOND ROW

AT (m+1)-TH ROTATION OF DRUM
RECORD 6TH ROW

AT (m+1)-TH ROTATION OF DRUM
RECORD 10TH ROW

AT (m+1)-TH ROTATION OF
DRUM RECORD 14TH ROW

AT (m+2)-TH ROTATION OF DRUM
RECORD 17TH ROW

FIG. 21 (a)

| NUMBER OF DRUM ROTATIONS | SPOT NUMBER | | | | | | | | | | | | | | | | | | | | | | | | | | | | | | | | | | | | | | | | | | | | | | | | | | | DISPLAY |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| m | 7 | | 8 | | 9 | | 10 | | 11 | | 12 | | 13 | | | | | | | | | | | | | | | | | | | | | | | | | | | | | | | | | | | | | | 0 |
| m + 1 | | 1 | | 2 | | 3 | | 4 | | 5 | | 6 | | 7 | | 8 | | 9 | | 10 | | 11 | | 12 | | 13 | | | | | | | | | | | | | | | | | | | | | | | | | | 1 |
| m + 2 | | | | | | | | | | | | | | | 1 | | 2 | | 3 | | 4 | | 5 | | 6 | | 7 | | 8 | | 9 | | 10 | | 11 | | 12 | | 13 | | | | | | | | | | | | | | 2 |
| m + 3 | | | | | | | | | | | | | | | | | | | | | | | | | | | | 1 | | 2 | | 3 | | 4 | | 5 | | 6 | | 7 | | 8 | | 9 | | 10 | | 11 | | 12 | | 13 | 3 |

FIG. 21 (b)

| SUB-SCAN LINE NUMBER | 1 | | | | 5 | | | | | 10 | | | | | 15 | | | | | 20 | | | | | 25 | | | | | 30 | | | | | 35 | | | | | 40 | | | | | 45 | | | | | 50 | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 1 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |
| 2 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |
| 3 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |
| 4 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |
| 5 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |
| 6 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |
| 7 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |
| 8 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |
| 9 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |
| 10 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |
| 11 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |
| 12 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |
| 13 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |
| 14 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |
| 15 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |
| 16 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |
| 17 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |
| 18 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |
| 19 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |
| 20 | 0 | 1 | 0 | 1 | 0 | 1 | 0 | 1 | 0 | 1 | 0 | 1 | 0 | 1 | 2 | 1 | 2 | 1 | 2 | 1 | 2 | 1 | 2 | 1 | 2 | 1 | 2 | 3 | 2 | 3 | 2 | 3 | 2 | 3 | 2 | 3 | 2 | 3 | 2 | 3 | | 3 | | 3 | | 3 | | 3 | | 3 | | 3 |

FIG. 22 (a)

| NUMBER OF DRUM ROTATIONS | SPOT NUMBER | | | | | | | | | | | | | | | | | | | | | | | | | | | | | | | | | | | | | | | | | | | | | | | | DISPLAY |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| m | 13 | 14 | 15 | 16 | 17 | 18 | 19 | 20 | 21 | 22 | 23 | 24 | | | | | | | | | | | | | | | | | | | | | | | | | | | | | | | | | | | | | 0 |
| m + 1 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | | | | | | | | | | | | | | | | | | | | | | | | | 1 |
| m + 2 | | | | | | | | | | | | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | | | | | | | | | | | | | 2 |
| m + 3 | | | | | | | | | | | | | | | | | | | | | | | | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 3 |

FIG. 22 (b)

| SUB-SCAN LINE NO. / MAIN SCAN LINE NO. | 1 | | | | 5 | | | | | 10 | | | | | 15 | | | | | 20 | | | | | 25 | | | | | 30 | | | | | 35 | | | | | 40 | | | | | 45 | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | | | | | | | | | | | | |
| 2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| 3 | 0 | 0 | 0 | 0 | 0 | 0 | 0 | 0 | 0 | 0 | 0 | 0 | 0 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | | | | | | | | | | | | |
| 4 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| 5 | 0 | 0 | 0 | 0 | 0 | 0 | 0 | 0 | 0 | 0 | 0 | 0 | 0 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | | | | | | | | | | | | |
| 6 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| 7 | 0 | 0 | 0 | 0 | 0 | 0 | 0 | 0 | 0 | 0 | 0 | 0 | 0 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | | | | | | | | | | | | |
| 8 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| 9 | 0 | 0 | 0 | 0 | 0 | 0 | 0 | 0 | 0 | 0 | 0 | 0 | 0 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | | | | | | | | | | | | |
| 10 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| 11 | 0 | 0 | 0 | 0 | 0 | 0 | 0 | 0 | 0 | 0 | 0 | 0 | 0 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | | | | | | | | | | | | |
| 12 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| 13 | 0 | 0 | 0 | 0 | 0 | 0 | 0 | 0 | 0 | 0 | 0 | 0 | 0 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | | | | | | | | | | | | |
| 14 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| 15 | 0 | 0 | 0 | 0 | 0 | 0 | 0 | 0 | 0 | 0 | 0 | 0 | 0 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | | | | | | | | | | | | |
| 16 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| 17 | 0 | 0 | 0 | 0 | 0 | 0 | 0 | 0 | 0 | 0 | 0 | 0 | 0 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | | | | | | | | | | | | |
| 18 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| 19 | 0 | 0 | 0 | 0 | 0 | 0 | 0 | 0 | 0 | 0 | 0 | 0 | 0 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | | | | | | | | | | | | |
| 20 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |

AT m-TH ROTATION OF DRUM (THICK NUMERALS FORM PATTERNS RECORDED AT PRESENT ROTATION)

AT (m+1)-TH ROTATION OF DRUM (THICK NUMERALS FORM PATTERNS RECORDED AT PRESENT ROTATION; THIN NUMERALS FORM PATTERNS ALREADY RECORDED)

AT (m+2)-TH ROTATION OF DRUM (THICK NUMERALS FORM PATTERNS RECORDED AT PRESENT ROTATION; THIN NUMERALS FORM PATTERNS ALREADY RECORDED)

AT m-TH ROTATION OF DRUM

AT (m+1)-TH ROTATION OF DRUM

AT (m+2)-TH ROTATION OF DRUM

RECORDING APPARATUS AND RECORDING METHOD

BACKGROUND OF THE INVENTION

1. Field of the Invention

The present invention relates to a recording method and recording apparatus for recording information, such as images and characters, particularly information, such as color images and characters using color tones of K, C, M and Y colors, on a recording medium.

2. Description of the Related Art

For the recording of images and characters, there is known a recording method in which an image receiving sheet and a transfer sheet are layered one on the other, and in this state, are fixed onto a drum, and those are exposed to laser light. In this case, the image receiving sheet is wound around the drum in a state that its image receiving layer is directed upward. The transfer sheet is wound on the drum in a state that its toner layer is layered on the image receiving layer of the image receiving sheet. A recording head of the laser exposure type is reciprocatively moved in directions parallel to the rotational shaft of the drum. The recording head emits laser light and takes the form of a plurality of spots of light when it lands on the recording medium. The plural spots 1, as shown in FIG. 15, are linearly arrayed in the moving direction of the recording head. In the recording method, the rotational direction of the drum is coincident with a main scan direction, and the moving direction of the recording head is coincident with a sub scan direction. Accordingly, when the rotational motion of the drum and the linear motion of the recording head are combined, the transfer sheet is scanned with the spots to thereby transfer a desired image on the image receiving sheet.

In the recording method, optical energy of the laser light is transduced into thermal energy by the optical-to-thermal transducing layer at a recording local area or part irradiated with the laser spots. At this time, the heat generation is instantaneously performed, and water and organic solvent, which are contained in the optical-to-thermal transducing layer and the toner layer, are volatilized, and called gas is generated. Accordingly, in the recording method in which the image receiving sheet and the transfer sheet are layered one on the other, and an acting layer acting in connection with the laser light is sandwiched between those sheets, the gas generated is hard to run out into the air, and stays between the image receiving sheet and the transfer sheet.

At both ends of the spot array, the gas is easy to run out in the sub-scan direction (the right side or left side in FIG. 15). At the central part of the spot array, the generated gas is hard to run out in the sub-scan direction, and it stagnates at the central part of the spot array.

At the central part of the spot array, the generated gas is put between the toner layer and the image receiving layer, so that the toner layer and the image receiving layer are not in close contact with each other. In this state, the toner layer is not transferred to the image receiving layer even at a part of the recording medium irradiated with the laser light. As a result, no color or thin color is formed on that part in the final image. When this phenomenon is observed macroscopically (by the eye), a stripe (vertical stripe) 3 appears which extends in the drum rotational direction, as shown in FIG. 15, and it will be an image defect.

For example, when 32 spots are arrayed at an interval of 10 μm (2450 dpi), a distance between the spots located at both ends of the spot array in the sub-scan direction, is 310 μm. In an another example where 256 spots are arrayed at an interval of 10 μm (2450 dpi), a distance between the spots located at both ends of the spot array in the sub-scan direction, is 2550 μm. As the spot-to-spot distance between both ends of the spot array becomes larger, the gas is harder to run out at the central part, and also when it is observed by the eye, it becomes the image unevenness and it is easily recognizable.

To be more specific, the gas stagnates at the central part of the spot array, and the toner layer and the image receiving layer are not in close contact with each other. In this state, heat generated in the optical-to-thermal transducing layer of the transfer sheet does not flow to the image receiving layer; in a usual case, it flows to the latter. And heat is accumulated in the transfer sheet. The result is that the optical-to-thermal transducing layer of the transfer sheet and the toner layer are heated and its temperature is higher than that in the normal state. When the temperature rises till the optical-to-thermal transducing layer and the toner layer are decomposed, gas is further generated, and the optical-to-thermal transducing layer and the toner layer are molten and decomposed to thereby lose their normal state. In this state, an optical density at the central part is low, or the optical-to-thermal transducing layer, which should not be transferred, is transferred onto the image receiving layer. More serious image defect occurs.

SUMMARY OF THE INVENTION

Accordingly, an object of the present invention is to provide a recording method and recording apparatus in which the gas generated at the recording local area does not stagnate in an already recorded area between the toner layer and the image receiving layer, thereby preventing the formation of the image defect resulting from the spot array.

To achieve the above object, there is provided an image recording method executed by a recording apparatus having a recording medium fixing member for fixing a recording medium, which is formed by coupling together a toner layer of a transfer film as a heat mode sensitive material and an image receiving layer of a receiver film in a layering manner, and a recording head capable of irradiating the recording medium with a plurality of spots of light, wherein the recording head exposes the recording medium in accordance with image/character data to thereby record a desired image on the recording medium, in a manner that the recording head is moved relative to the recording medium fixed to the recording medium fixing member in a main scan direction in which the recording head is moved relative to the recording medium, and the plurality of spots irradiated and arrayed on the recording medium are moved in a sub-scan direction orthogonal to the main scan direction, the exposure operation being performed by relatively moving the recording head from a position near the original point of the sub-scan to a position near the end of the sub-scan.

The image recording method thus constructed is improved in that in a first exposure operation, which is performed by moving the recording head from a position near the original point of the sub-scan to a position near the end of the sub-scan, the recording medium is exposed to the light containing information of image/character data, while forming pixel groups (referred to as island patterns) each consisting of a predetermined number of pixels consecutively arrayed on the recording medium in the main and sub-scan directions, and in a second exposure operation and the subsequent ones, the pixels in an unexposed area other than the island patterns on the recording medium are successively exposed to the light.

According to another aspect of the invention, there is provided a recording apparatus having a recording medium fixing member for fixing a recording medium, which is formed by coupling together a toner layer of a transfer film as a heat mode sensitive material and an image receiving layer of a receiver film in a layering manner, and a recording head capable of irradiating the recording medium with a plurality of spots of light, wherein the recording head exposes the recording medium in accordance with image/character data to thereby record a desired image on the recording medium, in a manner that the recording head is moved relative to the recording medium fixed to the recording medium fixing member in a main scan direction in which the recording head is moved relative to the recording medium, and the plurality of spots irradiated and arrayed on the recording medium are moved in a sub-scan direction orthogonal to the main scan direction. The recording apparatus thus constructed is improved by an exposure controller device operating such that in a first exposure operation, which is performed by moving the recording head from a position near the original point of the sub-scan to a position near the end of the sub-scan, the recording medium is exposed to the light containing information of image/character data, while forming pixel groups (referred to as island patterns) each consisting of a predetermined number of pixels consecutively arrayed on the recording medium in the main and sub-scan directions, and in a second exposure operation and the subsequent ones, the pixels in an unexposed area other than the island patterns on the recording medium are successively exposed to the light.

In a preferred embodiment of the image recording apparatus, in the first exposure operation, after the recording head reaches a position near the end of the sub-scan and returns to a position near the original point of the sub-scan in the first exposure operation, the pixels in the unexposed area not having been exposed in the preceding exposure operation are exposed R times (R: positive integer).

In another preferred embodiment of the image recording apparatus, in the first exposure operation, after the recording head reaches the position near the end of the sub-scan in the first exposure operation, the recording head returns to the position near the original point of the sub-scan while exposing the pixels in the unexposed area not having been exposed in the preceding exposure operation.

In yet another preferred embodiment of the image recording apparatus, at the R-th exposure by the recording head, the recording head may expose the pixels as defined by the image/character data in an area on the recording medium other than the area on the recording medium which has been exposed in the first to (R−1)th exposure operations.

In still another preferred embodiment of the image recording apparatus, at the first exposure operation, a percentage of the island patterns to the whole image/character data to be exposed is 20% to 80%.

In a further preferred embodiment of the image recording apparatus, a percentage of the pixels as defined by the image/character data in an area on the recording medium other than the area on the recording medium which has been exposed in the first to (R−1)th exposure operations, to the whole image/character data to be exposed is 20% or higher.

According to yet another aspect of the invention, there is provided an image recording method executed by a recording apparatus having a recording medium fixing member for fixing a recording medium, which is formed by coupling together a toner layer of a transfer film as a heat mode sensitive material and an image receiving layer of a receiver film in a layering manner, and a recording head capable of irradiating the recording medium with a plurality of spots of light, wherein the recording head exposes the recording medium in accordance with image/character data to thereby record a desired image on the recording medium, in a manner that the recording head is moved relative to the recording medium fixed to the recording medium fixing member in a main scan direction in which the recording head is moved relative to the recording medium, and the plurality of spots irradiated and arrayed on the recording medium are moved in a sub-scan direction orthogonal to the main scan direction, the exposure operation being performed by relatively moving the recording head from a position near the original point of the sub-scan to a position near the end of the sub-scan. The image recording method is improved in that where the spots of light are divided into an "n" umber of blocks (n=positive integer of 2 or larger), the recording medium is exposed by using the first block of spots, while forming pixel groups (referred to as island patterns) each consisting of a predetermined number of pixels consecutively arrayed on the recording medium in the main and sub-scan directions, and the pixels in an unexposed area other than the island patterns on the recording medium are gradually exposed by using the 2nd to (n−1)th blocks of spots, and the remaining pixels in the unexposed area are exposed by the n-th block of spots.

According to still another aspect of the invention, there is provided a recording apparatus having a recording medium fixing member for fixing a recording medium, which is formed by coupling together a toner layer of a transfer film as a heat mode sensitive material and an image receiving layer of a receiver film in a layering manner, and a recording head capable of irradiating the recording medium with a plurality of spots of light, wherein the recording head exposes the recording medium in accordance with image/character data to thereby record a desired image on the recording medium, in a manner that the recording head is moved relative to the recording medium fixed to the recording medium fixing member in a main scan direction in is which the recording head is moved relative to the recording medium, and the plurality of spots irradiated and arrayed on the recording medium are moved in a sub-scan direction orthogonal to the main scan direction, the exposure operation being performed by relatively moving the recording head from a position near the original point of the sub-scan to a position near the end of the sub-scan. The recording apparatus is improved by an exposure controller device operating such that where the spots of light are divided into an "n" umber of blocks (n=positive integer of 2 or larger), the recording medium is exposed by using the first block of spots, while forming pixel groups (referred to as island patterns) each consisting of a predetermined number of pixels consecutively arrayed on the recording medium in the main and sub-scan directions, and the pixels in an unexposed area other than the island patterns on the recording medium are gradually exposed by using the 2nd to (n−1)th blocks of spots, and the remaining pixels in the unexposed area are exposed by the n-th block of spots.

In a preferred embodiment of the image recording apparatus as mentioned above, a percentage of an unexposed part at the exposure by the first block of spots to the whole image/character data to be exposed is 20% to 80%.

In another preferred embodiment of the image recording apparatus, a percentage of image/character data other than that exposed by the 1st to (n−1)th blocks of spots at the exposure by the n-th block of spots, to the whole image/character data to be exposed is 20% or higher.

In yet another preferred embodiment of the image recording apparatus, the island pattern is configured to be flat or outcurved at its downstream side as viewed in the main scan direction.

In still another preferred embodiment of the image recording apparatus, the outcurved part of the island pattern consists of at least two pixels consecutively arrayed in the sub-scan direction.

In further preferred embodiment of the image recording apparatus, the island pattern is configured to be slanted to the downstream side in the sub-scan direction, and to the upstream side in the main scan direction.

In an additional preferred embodiment of the image recording apparatus, an array of the plural island patterns is directed to the downstream side in the sub-scan direction and to the upstream in the main scan direction.

As described above, in the recording method in which the image receiving sheet and the transfer sheet are layered one on the other, and an acting layer acting in connection with the laser light is sandwiched between those sheets, the recording medium is exposed to light containing image data in the form of island patterns thereon. Therefore, the following useful effects are produced:

a. "Gas stagnation" is removed, and image unevenness is lessened;

b. The exposure method effectively operates for the image part of which the area rate (dot %) is 70% or higher.

BRIEF DESCRIPTION OF THE DRAWINGS

FIG. 4 is a diagram for conceptually showing a recording process.

DETAILED DESCRIPTION OF THE PREFERRED EMBODIMENTS

The preferred embodiments of a recording method and recording apparatus according to the present invention will be described with reference to the accompanying drawings.

Figure 1:
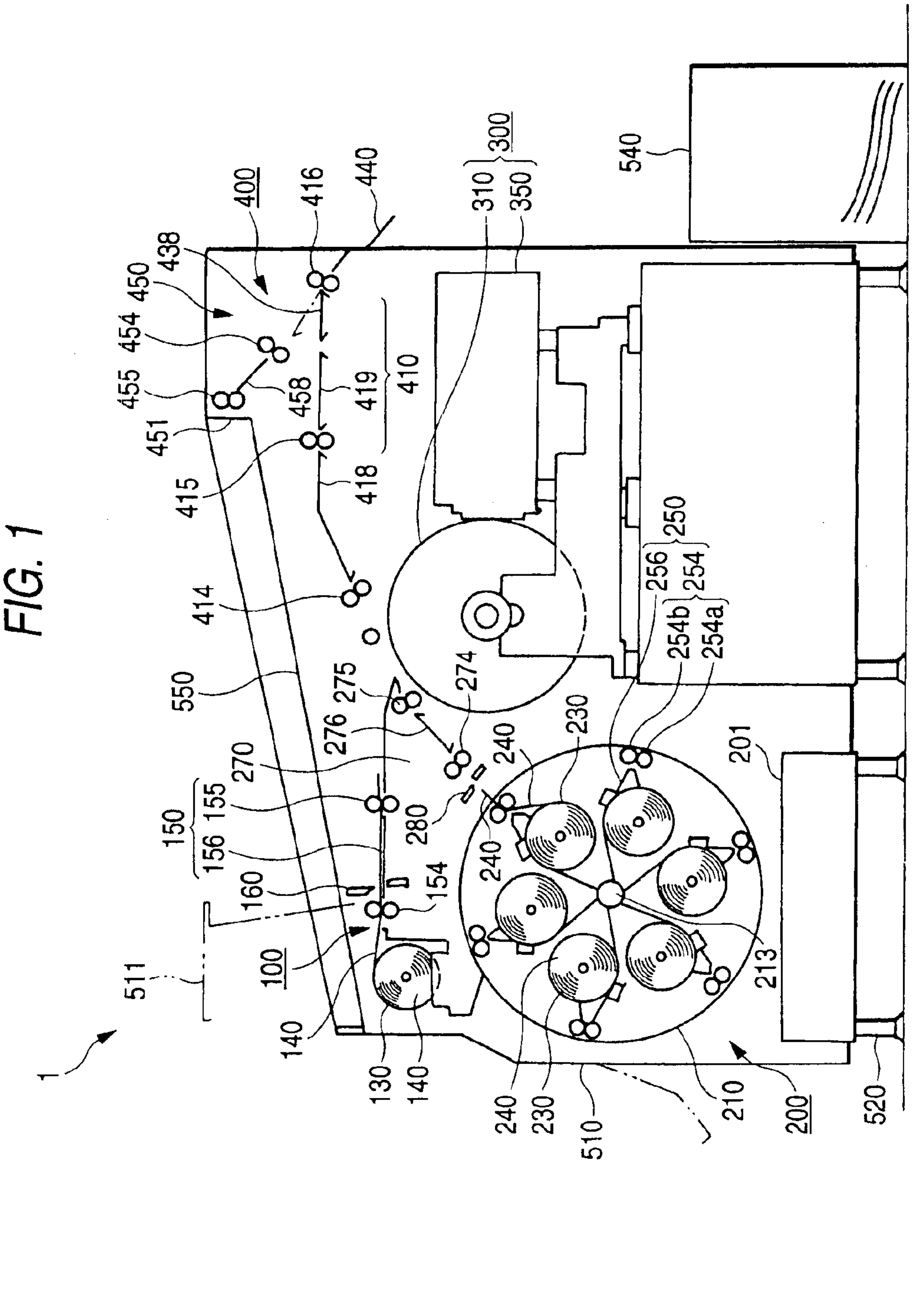
FIG. 1 is a diagram schematically showing a recording apparatus constructed according to the present invention.
Figure 2:
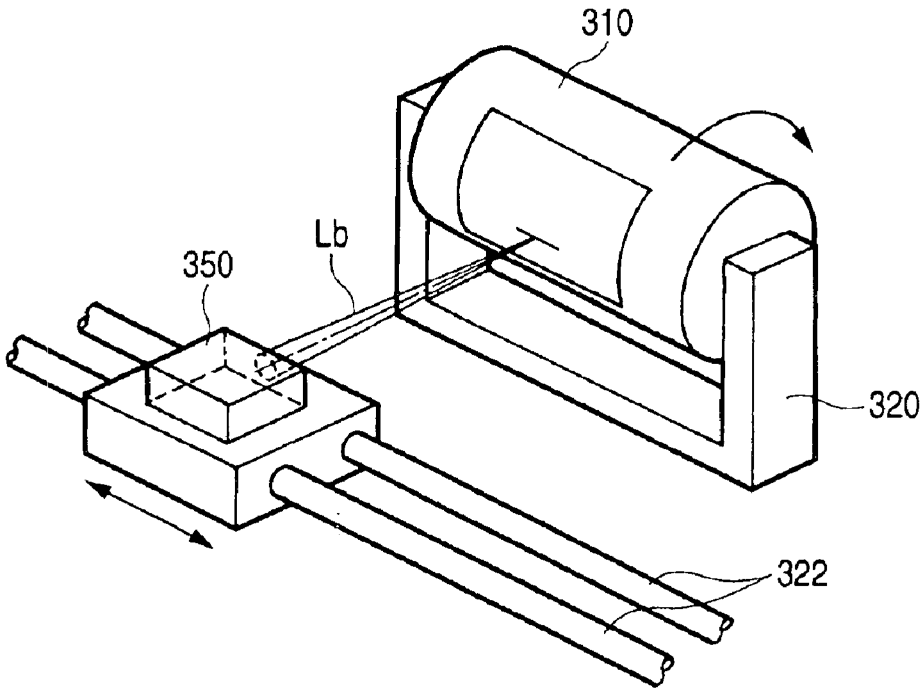
FIG. 2 is an enlarged, perspective view showing a recording section of the recording apparatus.
Figure 3:
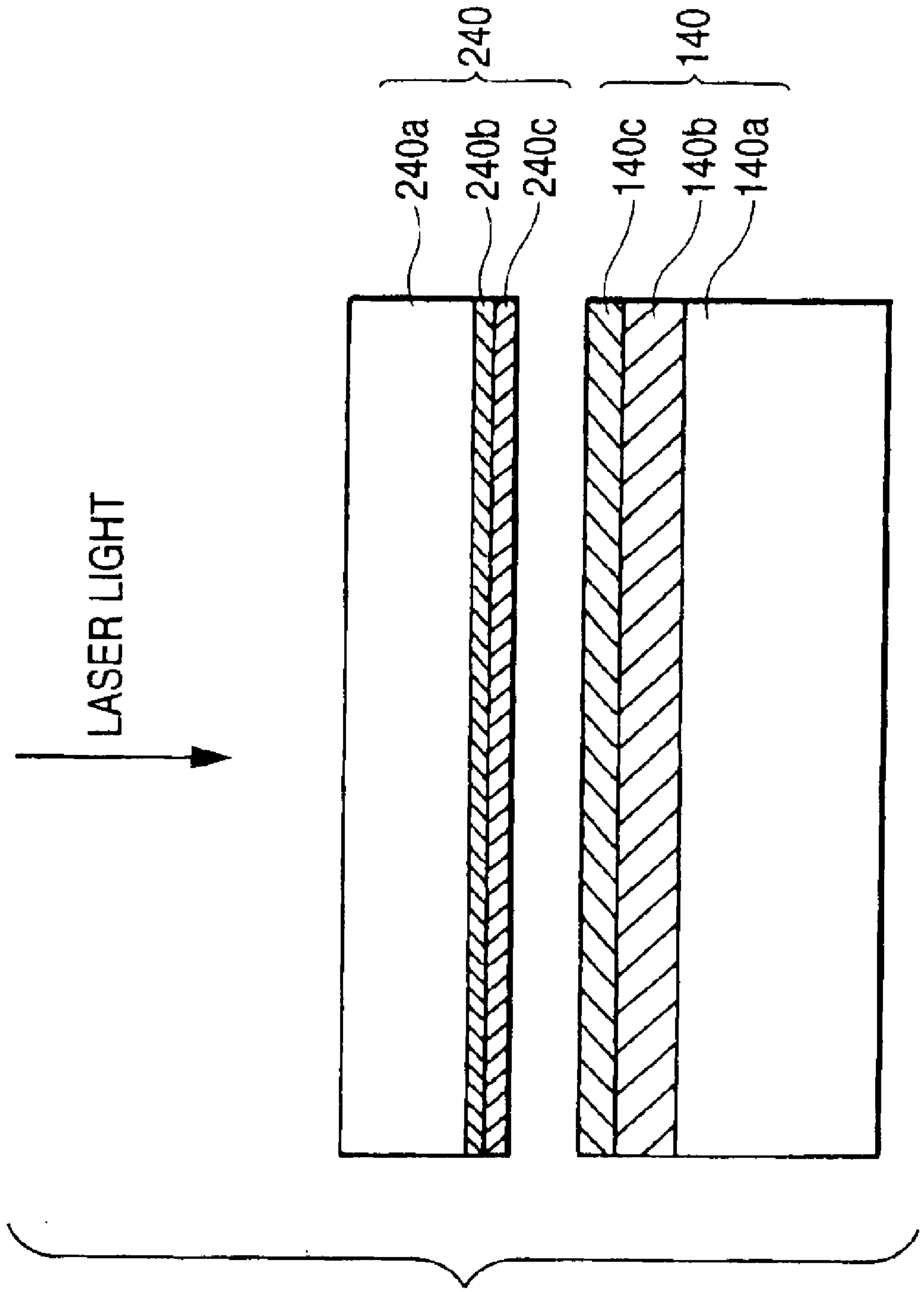
FIG. 3 is a cross sectional view showing a structure including an image receiving sheet and a transfer sheet, which is used in the recording method and the recording apparatus of the invention.
Figure 5:
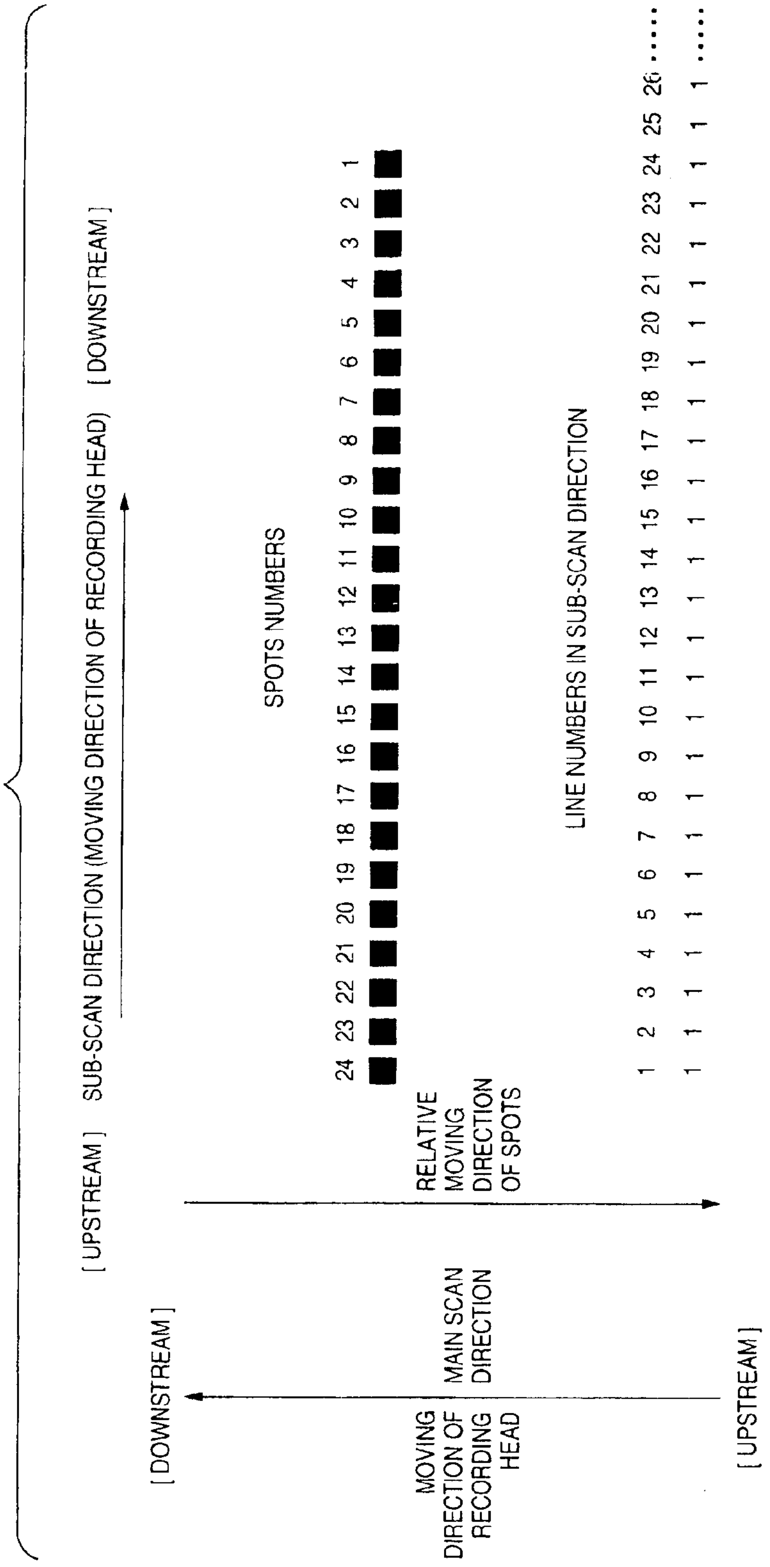
FIG. 5 is a diagram useful in explaining the main scan direction, sub-scan direction, laser spot numbers, line numbers in the sub-scan direction in the recording apparatus, those items being used for an island pattern exposure of the invention, FIGS. 6(*a*) and 6(*b*) are diagrams showing an "island pattern exposure process" which forms a first embodiment of the invention, specifically showing an exposure state on the recording medium after a first exposure operation is performed, FIGS. 7(*a*) and 7(*b*) are diagrams showing an "island pattern exposure process" which forms the first embodiment, specifically showing an exposure state on the recording medium after a second exposure operation is performed, FIGS. 8(*a*), 8(*b*), and 8(*c*) are diagrams showing a second instance of the first embodiment of the invention, FIGS. 9(*a*), 9(*b*), 9(*c*), and 9(*d*) are diagrams for explaining a shape of an island pattern not having gas stagnation, which is a second embodiment of the invention, FIGS. 10(*a*), 10(*b*), 10(*c*), and 10(*d*) are explanatory diagrams for explaining an island pattern free from the pattern omission, which forms a third embodiment of the invention, FIGS. 11(*a*), 11(*b*), 11(*c*), and 11(*d*) are explanatory diagrams for explaining an inappropriate island pattern which blocks the flowing of gas generated in the preceding thin-out exposure operation to the outside of the recording medium, FIGS. 12(*a*), 12(*b*), 12(*c*), and 12(*d*) are diagrams showing a fourth embodiment of the invention, which defines island patterns enabling the flowing of gas generated in the preceding thin-out exposure operation to smoothly flow out of the recording medium.

FIG. 1 is a diagram schematically showing a recording apparatus constructed according to the present invention; FIG. 2 is an enlarged, perspective view showing a recording section of the recording apparatus; FIG. 3 is a cross sectional view showing a structure including an image receiving sheet and a transfer sheet, which is used in the recording method and the recording apparatus of the invention; FIG. 4 is a diagram for conceptually showing a recording process; FIG. 5 is a diagram useful in explaining the main scan direction.

Sub-scan direction, laser spot numbers, line numbers in the sub-scan direction in the recording apparatus, those items being used for an island pattern exposure of the invention; and FIGS. 6 through 11 are explanatory diagrams for explaining an "island pattern exposure process" of the invention, which is carried out by using the laser light spots emitted from a recording head.

A recording apparatus 1, as shown in FIG. 1, includes an image receiving sheet supply section 100, a transfer sheet supply section 200, a recording section 300 and a discharge section 400. The recording apparatus 1 is covered with a body cover 510 and is supported by leg parts 520.

In the recording apparatus 1, the image receiving sheet supply section 100 supplies an image receiving sheet to the recording section 300. The transfer sheet supply section 200 is capable of supplying plural kinds of transfer sheets and selectively supplies one of those transfer sheets to the recording section 300. In the recording section 300, another transfer sheet is wound on the image receiving sheet, which is wound around a drum 310 as a recording medium fixing member. In this state, laser exposure is carried out in accordance with image information of an image to be recorded onto the recording medium formed by superimposing the transfer sheet on the image receiving sheet. An image is formed on the image receiving sheet in a manner that toner on a portion of the transfer sheet which is heated by the laser exposure process, is transferred and attached to the image receiving sheet by its adhesion deterioration, fusion or sublimation. Further, toners of different colors (e.g., black, cyan, magenta and yellow) on the transfer sheets are attach to the same image receiving sheet, to thereby forming a color image on the receiving sheet. As will be described later, this is realized in such a manner that the exposed transfer sheets are successively exchanged with transfer sheets of other colors, and subjected to the laser exposure process.

The image receiving sheet on which the image is formed, is discharged through the discharge section 400 and is taken out from the recording apparatus. Subsequently, in an image transfer section which is additionally provided and is not shown, the image receiving sheet is heated and pressed in a state that the image forming surface of the image receiving sheet is placed on a paper sheet to be printed. By so doing, the toner is transferred onto the desired paper sheet (printing sheet), whereby the image is formed.

The outline of the recording apparatus 1 is as mentioned above.

For the recording material, reference is made to Japanese patent laid-open No. 296594/1992, No. 327982/1992 and No. 327983/1992. For the device using the above recording material, reference is made to Japanese patent laid-open No. 290731/1995. For the citation of the recording apparatus using the embodiment, reference is made to Japanese patent laid-open No. 277831/1999.

The image receiving sheet supply section 100, the transfer sheet supply section 200, the recording section 300 and the discharge section 400 will be described successively.

The image receiving sheet supply section 100 includes an image receiving sheet roll 130. The image receiving sheet roll 130 is formed by winding the image receiving sheet 140 around the core. The image receiving sheet 140, as shown in FIG. 3, includes a supporting layer 140*a*, a cushion layer 140*b* and an image receiving layer 140*c*. The cushion layer 140*b* and the cushion layer 140*b* are successively laminated on the supporting layer 140*a*. PET (polyethylene) base, TAC (triacetyl-cellulose) base, PEN (polyethylene naphthalate) base or the like may be used for the supporting layer 140*a*. The image receiving layer 140*c* receives the toner to be transferred. The cushion layer 140*b* functions to absorb steps formed when a plurality of different toner layers are layered on upon the other. In the image receiving sheet roll 130, the image receiving layer 140*c* is wound so that the image receiving layer 140*c* is located outside with respect to the supporting layer 140*a* (the image receiving sheet roll thus wound will be referred to as an "outer winding" image receiving sheet roll). The image receiving sheet roll 130 is disposed so that it rotates about the central axis of the core.

The image receiving sheet supply section 100 further includes an image receiving sheet transporting part 150. The image receiving sheet transporting part 150 includes a motor (not shown), a drive force transmitting belt or a chain (not shown), transporting rollers 154 and 155, a supporting guide 156, an image receiving sheet cutting part 160 and a detection sensor (not shown) for detecting an end point of the image receiving sheet.

Each of transporting rollers 154 and 155 consists of a couple of rollers. With this driving mechanism, the image receiving sheet 140 is transported to the recording section 300, and is returned from the recording section 300.

To start, in a state that the leading end of the image receiving sheet roll 130 is nipped between the paired transporting rollers 154, the image receiving sheet 140 is pulled out by the driving mechanism including the motor. With this, the image receiving sheet roll 130 rotates, and the image receiving sheet 140 is successively transported. The image receiving sheet 140 thus transported is further transported, while being nipped between the transporting rollers 155 and guided by the supporting guide 156.

The image receiving sheet 140 thus transported by the image receiving sheet transporting part 150 is cut by the image receiving sheet cutting part 160 to have a predetermined length. The detection sensor is used for measuring the length of the image receiving sheet. The length measurement is conducted in a manner that the leading end of the image receiving sheet 140 is detected by the detection sensor, and the number of revolution of the motor is allowed for. The image receiving sheet 140 is cut to have a predetermined length on the basis of the measuring result, and then the sheet thus cut is supplied to the recording section 300. The image receiving sheet cutting part 160 includes a cutter, a supporting part and a guide (which are not shown). The image receiving sheet 140 delivered from the image receiving sheet roll 130 by the driving mechanism, is stopped in its transportation on the basis of the result of measuring the image receiving sheet, and is cut by the cutter to have a predetermined length.

In this way, the image receiving sheet supply section 100 delivers and cuts a part of the image receiving sheet roll 130, whereby the image receiving sheet 140 of a predetermined length is supplied to the recording section 300.

The transfer sheet supply section 200 will be described.

The transfer sheet supply section 200 includes a rotary rack 210. The rotary rack 210 is rotated about a rotary shaft 213, as will be described later. A plurality of transfer sheet rolls 230 (six in the figure) are installed in the rotary rack 210, and those are radially arranged about the rotary shaft 213.

Each of the transfer sheet rolls 230 includes a core, a transfer sheet 240 wound around the core, and flanges (not shown) inserted into both sides of the core. The transfer sheet roll 230 is rotatably supported about the core. The outside diameter of the flange is larger than that of the transfer sheet wound around the core, so that the rolled transfer sheet will not be deformed.

Each of the transfer sheet 240, as shown in FIG. 3, includes a supporting layer 240*a*, an optical-to-thermal transducing layer 240*b* and a toner layer 240*c*. The optical-to-thermal transducing layer 240*b* and the toner layer 240*c* are successively laminated on the supporting layer 240*a*. A material of the supporting layer 240*a* may be selected from among general supporting member materials (e.g., the same material as that of the supporting layer 140*a* as mentioned above), if it allows the laser light to transmit therethrough. The optical-to-thermal transducing layer 240*b* functions to transduce laser energy to heat. A material of the optical-to-thermal transducing layer 240*b* may be selected from among general optical-to-thermal transducing materials if those materials are capable of transducing optical energy to thermal energy. Examples of those materials are carbon, black substance, infrared absorption dyestuff and a specific wavelength absorbing material. Toner sheets of black (K), cyan (C), magenta (M) and yellow (Y) are used for the toner layer 240*c*.

In the transfer sheet roll 230, the toner layer 240*c* is wound so that the toner layer 240*c* is located outside with respect to the supporting layer 240*a* (the transfer sheet roll thus wound will be referred to as an "outer winding" transfer sheet roll). As will be described later, the toner layer 240*c* containing toner ink is transferred to the image receiving sheet by laser exposure.

In FIG. 1, there is illustrated a case where the six transfer sheets rolls 230 are installed within the rotary rack 210. Those six transfer sheets may be six kinds of transfer sheets, for example, transfer sheets of four colors, black, cyan, magenta and yellow, and the transfer sheets of two special colors (e.g., gold and silver).

The rotary rack 210 further includes transfer sheet delivering mechanisms 250 corresponding to those transfer sheet rolls 230. Each of the transfer sheet delivering mechanisms 250 includes a pair of feed rollers 254 and a supporting guide 256. In the figure, the rotary rack is provided with six transfer sheet delivering mechanisms 250. The feed rollers 254 includes a roller 254*a* and a roller 254*b*. The roller 254*a* is connected to a motor through a gear mechanism and is driven by the motor, as will be described later. The roller 254*a* cooperates with the roller 254*b* to nip the transfer sheet 240 therebetween at a predetermined pressing force. The roller 254*b* rotates in a direction opposite to that of the roller 254*a*, and transports the transfer sheet 240. The transfer sheet 240 is nipped between the rollers 254*a* and 254*b*, and is moved forward or backward. As the transfer sheet 240 is transported, the transfer sheet roll 230 rotates.

The transfer sheet 240 is supplied to the recording section 300 by the transfer sheet delivering mechanism 250 thus constructed. In a state that the leading end of the transfer sheet 240 is caught between the paired feed rollers 254, the feed rollers 254 are driven by the driving mechanism such as the motor. By the driving, the transfer sheet 240 is delivered. Further, the transfer sheet 240 is cut to have a predetermined length at a transfer sheet transporting part 270 to be described later, and is supplied to the recording section 300.

As described above, the rotary rack 210 containing a plurality of the transfer sheet rolls 230 is capable of selectively supplying the desired transfer sheet 240 to the transfer sheet transporting part 270.

The transfer sheet supply section 200 further includes the transfer sheet transporting part 270. The transfer sheet transporting part 270 includes a motor (not shown), a belt or chain (not shown) for transmitting a drive force, transporting rollers 274 and 275, a guide 276, a transfer sheet cutting part 280 and a detection sensor (not shown) for detecting an end of the transfer sheet. Each of the transporting rollers 274 and 275 consists of a pair of rollers. The transporting rollers 274 and 275 are connected to the motor by way of the belt or chain for transmitting the drive force, and driven by the motor to thereby transport the transfer sheet 240.

The transfer sheet 240 may be delivered to the recording section 300 or moved backward by the driving mechanism thus constructed. The transfer sheet 240 thus delivered is cut to have a predetermined length by the transfer sheet cutting part 280. The detection sensor is used for measuring the length of the transfer sheet 240. The length measurement may be conducted in a manner that the end of the transfer sheet 240 is detected by the detection sensor, and the number of revolution of the motor is allowed for. The transfer sheet 240 is cut to have a predetermined length on the basis of the measuring result, and then the sheet thus cut is supplied to the recording section 300. The transfer sheet cutting part 280 includes a cutter, a supporting part, a guide and the like (which are not shown).

In this way, the transfer sheet supply section 200 delivers and cuts a part of the transfer sheet roll 230, whereby the transfer sheet 240 of a predetermined length is supplied to the recording section 300.

When the transfer sheet 240 is consumed, it is necessary to detach the used transfer sheet roll 230 from the related part and to replace it with a new transfer sheet 240.

The replacement work of the transfer sheet roll 230 may be carried out in a state that a lid 511 is opened. To carry out the replacement work, the rotary rack 210 is turned, and the transfer sheet roll 230 to be replaced is moved to a predetermined replacement position corresponding to the lid 511. The replacement work for the image receiving sheet roll 130 is also performed after the lid 511 is opened.

The recording section 300 will be described.

The recording section 300 includes the drum 310. The drum 310, as shown in FIG. 2, is hollow and cylindrical in shape, and is rotatably supported by a frame 320. In the recording apparatus 1, the rotary direction of the drum 310 is coincident with the main scan direction. The drum 310 is coupled to a rotary shaft of a motor and is driven to rotate by the motor. A plurality of holes are formed in the surface of the drum 310. The holes are communicatively coupled to a suction device such as a blower or a vacuum pump (not shown).

The image receiving sheet 140 and the transfer sheet 240 are put on the drum 310, and when the suction device is operated, those sheets are attracted and stuck onto the drum 310.

The drum 310 has a plurality of grooves (not shown), and those grooves, and those grooves are arrayed in a straight line and parallel to the rotary shaft of the drum 310. Above the drum 310, a plurality of peeling-off pawls (not shown) are arrayed in a straight line and parallel to the rotary shaft of the drum 310.

The recording section 300 includes a recording head 350. The recording head 350 is capable of emitting a laser light Lb. Toner ink at a position on the transfer sheet 240, which is irradiated with the laser light Lb, is transferred onto the surface of the image receiving sheet 140. The recording head 350 is linearly moved by a driving mechanism (not shown) along a guide rail 322 in a direction parallel to the rotary shaft of the drum 310. In the recording apparatus 1, the moving direction of the recording head is coincident with the sub-scan direction. When the rotating motion of the drum 310 and the liner movement of the recording head 350 are combined, the recording head is able to irradiate, for exposure, a desired position on the transfer sheet 240 covering the image receiving sheet 140 with laser light emitted therefrom. Accordingly, a desired image may be transferred to the image receiving sheet 140 in a manner that the surface of the transfer sheet 240 is scanned with the image-depicting laser light Lb, and only the positions on the sheet as defined by image information are exposed to the laser light.

The laser light Lb emitted from the recording head 350 will be described in detail.

The recording head 350 includes a light emitting element (not shown) for emitting the laser light Lb or includes an optical modulating element for modulating the laser light emitted from the light emitting element. Laser light spots may be arrayed as desired in a manner that a plurality of light emitting elements are arrayed at desired positions, and a modulation windows are arrayed at desired positions.

In the embodiment, the laser light emitted from the recording head 350 is used for executing an "island pattern exposure process" of the invention (FIGS. 6 through 11). This will be described later in detail after the remaining portions of the recording apparatus of the invention are described.

The operation of winding the image receiving sheet 140 and the transfer sheet 240 onto the drum 310 will be described.

The two kinds of sheets, the image receiving sheet 140 and the transfer sheet 240, are wound around the drum 310. To start, the image receiving sheet 140 supplied from the image receiving sheet supply section 100 is wound on the drum 310. As described above, a plurality of holes (not shown) are formed in the surface of the drum 310, and the image receiving sheet 140 is attracted thereto by the suction device (not shown). With this, the image receiving sheet 140 is wound around the drum 310 with the rotation of the drum 310, while being attracted to the drum 310.

Subsequently, a single transfer sheet 240 supplied from the transfer sheet supply section 200 is wound on the image receiving sheet 140. The two kinds of sheets, the image receiving sheet 140 and the transfer sheet 240, are different in size. The transfer sheet 240 is larger than the image receiving sheet 140 in the longitudinal and lateral directions. Therefore, the transfer sheet 240 is attracted to the drum 310 by its portion exceeding the image receiving sheet 140. With rotation of the drum 310, the transfer sheet 240 is wound while being attracted to the drum 310.

When the image receiving sheet 140 and the transfer sheet 240 are wound on the drum 310, the toner layer 240*c* of the transfer sheet 240 is in contact with the image receiving layer 140*c* of the image receiving sheet 140. Toner ink on the toner layer 240*c* thus positionally related is exposed to the laser light by the recording head 350, as described above, and is transferred to the image receiving sheet 140. The transfer sheet 240 having undergone the transferring operation is peeled off from the drum 310.

Next, the peeling-off process will be described.

To start, the drum 310 is rotated to a predetermined position at which the transfer sheet is peeled off. The tip of each peeling-off pawl is moved from a standby position at which the pawls are not in contact with the drum 310, to a position at which the pawls come in contact with the drum 310. At the time of moving of the pawls, the tip of each peeling-off pawl is kept away from the transfer sheet 240. With the rotation of the drum 310, the peeling-off pawls relatively move on the drum 310 and along the surface of the drum 310 in the circumferential direction. The tip of each peeling-off pawl relatively moves along the groove formed therein on the surface of the drum 310, and advances to under the transfer sheet 240. At this time, the transfer sheet 240 moves along the upper surface of the peeling-off pawls, and then the transfer sheet 240 is peeled off from the drum 310.

The peeling-off pawls rise in a direction in which the pawls move apart from the drum 310 before those come contact with the image receiving sheet 140, and move to the standby position. After the leading end of the transfer sheet 240 is peeled off, the transfer sheet 240 is further peeled off from the drum 310 and the image receiving sheet 140, with the rotation of the drum 310. At this time, the image receiving sheet 140 remains attracted to the drum 310 by the sucking force of the sucking device, and accordingly, only the transfer sheet 240 may be peeled off.

The transfer sheet 240 thus separated, is discharged outside the apparatus by way of the discharge section 400 to be described later.

Subsequently, a transfer sheet 240 of another color is wound, by the above procedure, on the image receiving sheet 140 remaining wound on the drum 310. After the above-mentioned operation is performed, and the toner ink of the transfer sheet 240 is transferred on the image receiving sheet 140 by the laser exposure process, the transfer sheet 240 is peeled off and discharged.

A similar same operation is repeated for given plural kinds of transfer sheets 240. The operation is repeated for four kinds of transfer sheets 240 of, for example, black, cyan, magenta and yellow, so that a color image is transferred on the image receiving sheet 140.

Finally, the image receiving sheet 140 having the plural kinds of toner inks thus transferred thereon is peeled off. The image receiving sheet 140 is peeled off in a similar way to that of peeling off the transfer sheet 240. At this time, the peeling-off pawls approach plural grooves and separate the image receiving sheet 140 from the drum 310. The same peeling-off pawls as used when the transfer sheet 240 is peeled off may be used, so that the mechanical structure thereof may be simplified. Accordingly, the apparatus reliability is improved.

The image receiving sheet 140 thus separated is discharged to the discharge section 400.

The discharge section 400 will be described.

The discharge section 400 includes a sheet common transporting part 410, a transfer sheet discharge part 440 and an image receiving sheet discharge part 450.

The sheet common transporting part 410 includes a motor (not shown), a belt or chain (not shown) for transmitting drive force, transporting rollers 414, 415 and 416, supporting guides 418 and 419, and a detection sensor (not shown). The sheet common transporting part 410 further includes a movable guide part made up of a guide plate 438 and a driving mechanism (not shown). The guide plate 438 is movable between two positions to be described later when it is driven by the driving mechanism.

The transfer sheet discharge part 440 is used for discharging the processed transfer sheet 240 to a transfer sheet recovering box 540.

The image receiving sheet discharge part 450 includes an image receiving sheet exit port 451, rollers 454 and 455, and a guide 458. The image receiving sheet 140 having an image transferred thereto is discharged to a tray 550, through the image receiving sheet discharge part 450.

Each of transporting rollers 414, 415, 416, 454 and 455 consists of a pair of rollers, like as other transporting rollers already stated. The paired rollers nip the image receiving sheet 140 and the transfer sheet 240, and in this state, transport those sheets.

The discharge section 400 having such a mechanism discharges the image receiving sheet 140 and the transfer sheet 240 in the following manners.

The discharging of the transfer sheet 240 will first be described.

The transfer sheet 240, which has been laser exposed in the recording section 300 and been out of use, is peeled off from the drum 310 by the above procedures. The transfer sheet 240 separated is transported forward, while being supported by the peeling-off pawls, the supporting guides 418 and 419, and the guide plate 438, and being nipped between the transporting roller pairs 414, 415 and 416.

Next, the discharging of the image receiving sheet 140 will be described.

After the image receiving sheet 140 receives the toner ink and is processed in the recording section 300, it is peeled off from the drum 310, as mentioned above. The separated image receiving sheet 140 is transported forward, while being supported by the peeling-off pawls, the supporting guides 418 and 419, and the guide plate 438, and being nipped between the transporting roller pairs 414, 415 and 416.

The sheet common transporting part 410 is also used for the discharging of the transfer sheet 240. Therefore, the sheet transport mechanism is simpler than in the case where the transport parts are respectively provided for those sheets. In the sheet common transporting part 410, the transfer sheet 240 is transported in a state that the toner layer thereof is directed downwards. The image receiving sheet 140 is transported in a state that the image receiving layer thereof is directed upwards. Therefore, when the image receiving sheet 140 and the transfer sheet 240 are successively transported by utilizing the same transporting path, there is no fear that the image formed on the image receiving layer of the image receiving sheet 140 is soiled.

The image receiving sheet 140 is transported by the transporting rollers 414, 415 and 416, and is temporarily discharged outside the apparatus. In this case, however, the whole image receiving sheet 140 is discharged outside. To be more specific, in a state that the trailing end of the image receiving sheet 140 is put on the guide plate 438 and is nipped between the transporting roller pair 416, the driving by the motor is temporarily stopped, and the motor is reversely turned to move the image receiving sheet 140 back to the image receiving sheet exit port 451. That is, the "switch-back" operation is performed. A timing of stopping the driving by the motor is determined by using a signal derived from the detection sensor. The detection sensor detects that the trailing end of the image receiving sheet 140 passes the position of the detection sensor. Then, the image receiving sheet 140 is transported and reaches a predetermined position, and at this time, the driving by the motor is stopped.

Here, the "predetermined position" means a position at which the trailing end of the image receiving sheet 140 is put on the guide plate 438 and is nipped between the transporting roller pair 416. Whether or not the image receiving sheet 140 is moved a predetermined distance till it reaches this position, is judged from, for example, the number of pulses representative of a rotation of the motor, which is counted from an instant that the detection sensor detects the trailing end of the image receiving sheet.

The guide plate 438 of the movable guide part is driven by a driving mechanism (not shown) and is movable between a position indicated by a solid line and another position by a broken line. Thus, the guide plate 438 is moved by the driving mechanism. When the motor being standstill is reversely rotated, the transporting rollers 416, 454 and 455 are driven in the reverse direction. By the reverse rotation, the image receiving sheet 140 is moved backward. The image receiving sheet 140 is further transported, by the transporting rollers 454 and 455, to the tray 550, while being supported by the guide 458. The image receiving sheet having been delivered to the tray 550 is taken out from the recording apparatus, as described above, and is additionally processed at an image transfer section, which is separately provided. As a result, the image is printed on a desired printing sheet.

The operation described above is controlled by a controller section (not shown).

The controller section controls the image receiving sheet supply section 100, the transfer sheet supply section 200, the recording section 300, the discharge section 400 and the like. In the respective sections, the controller section controls the driving part including the motor and the like. Particularly, in the recording section 300, the controller section further controls the air part, such as the suction device, and an image processing part for processing image data. The driving part of the transfer sheet supply section 200 includes two driving systems, i.e., a rotation driving system for the rotary rack 210 and a sheet-transport driving system for supplying the transfer sheet 240 from the transfer sheet roll 230 to the drum 310. For the driving of the motor in the sheet-transport driving system drives the motor, the driver for motor driving is used commonly for the plurality of transfer sheet delivering mechanisms, as described above. Accordingly, the drive circuit system is simplified.

The recording apparatus as described above is capable of forming a desired color image on the image receiving sheet 140.

Description will be given on operation procedures when a color image is formed by using four colors, black, cyan, magenta and yellow.

To start with, as shown in FIG. 4, in a step 1, the image receiving sheet supply section 100 supplies an image receiving sheet 140 to the drum 310. In this case, the image receiving sheet 140 is supplied in a manner that a part of the outer-winding image receiving sheet roll 130 is delivered and cut, and is wound on the drum 310.

In a step 2, the transfer sheet supply section 200 supplies a transfer sheet 240 of black (K) to the drum 310.

Specifically, the rotary rack 210 of the transfer sheet supply section 200 rotates to thereby move the transfer sheet roll 230 of black to a position facing the transfer sheet transporting part 270. The transfer sheet 240 is supplied in a manner that a part of the outer-winding transfer sheet roll 230 is delivered and cut, and is wound on the drum 310. At this time, the leading end of the transfer sheet 240 being delivered from the transfer sheet roll 230 is at a position near the cutter 280 disposed outside the rotary rack 210. In this case, following the supply of the transfer sheet 240, the transfer sheet delivering mechanism 250 reversely turns the feed roller 254 to store the leading end of the transfer sheet roll 230 on the inner side of the outer peripheral of the rotary rack 210. Also in this case, the feed rollers 254 still nip the leading end of the transfer sheet roll.

In a step 3, the transfer sheet 240 is heated and pressed, and laminated. This laminating process is omitted sometimes.

In a step 4, a latent image is formed on the image receiving sheet 140 in accordance with image data previously applied. The image data is further color separated into image data of respective colors. Laser exposure is performed in accordance with the color separated image data of the respective colors. The recording head 350 irradiates the transfer sheet 240 with image forming laser light spots Lb in accordance with the color image data after color separated. Toner ink of the transfer sheet 240 is transferred onto the image receiving sheet 140, and an image is formed on the image receiving sheet 140.

In a step 5, only the transfer sheet 240 of "K" is peeled off from the drum 310. The transfer sheet 240 having been separated from the drum 310 is discharged through the discharge section 400 to the transfer sheet recovering box 540.

At this time, judgement is made as to whether or not the transfer operation has been performed for the transfer sheets 240 of all colors. If the supply of another kind of transfer sheet 240 is needed, the sequence of operations from the steps 2 to 5 is repeated. In other words, the sequence of operations steps 6 to 17 is repeated for the transfer sheets 240 of other colors, cyan, magenta and yellow. As a result, the toner inks of K, C, M and Y of four-color transfer sheets are transferred to one image receiving sheet 140, so that a color image is formed on the image receiving sheet 140.

When the process ends, it is judged that the laser exposure of the final transfer sheet 240 is completed.

And, the image receiving sheet 140 is peeled off from the drum 310. The peeled image receiving sheet 140 is discharged through the discharge section 400 to the tray 550, while undergoing the switch-back operation. In the image transfer part separately provided, the toner ink is further transferred from The image receiving sheet 140 as discharged onto a desired printing sheet. By this, the color printing for color proofing is performed.

The "island pattern exposure process" of the invention will be described by taking a called "solid recording" as an example. FIG. 5 is a diagram for explaining the main scan direction, sub-scan direction, laser spot numbers, line numbers in the sub-scan direction in the recording apparatus, which are used for the island pattern exposure process of the invention.

In the figure, the main scan direction of the recording apparatus is coincident with the rotational direction of the drum, and in the figure, the drum rotates in the upward direction as indicated by an arrow. Accordingly, a relative motion of the laser spot takes a downward direction as indicated by an arrow in the figure. The sub-scan direction is coincident with the moving direction of the recording head, and the recording head moves from left to right as indicated by an arrow in the figure. 24 number of laser spots to be formed on the recording medium by a laser beam emitted from the recording head are substantially horizontally arrayed, and those spots are numbered 1 to 24 in the order from the end of the sub-scan. In this instance, the number of laser spots is set at 24. Such number is selectively used for ease of explanation, but actually, 32 to 2000 number of laser spots are used. A distance between the center of one laser spot to the center of another laser spot adjacent to the former may be set within a range from 1 $\mu$m to 30 $\mu$m. Description will be given using a case where the center-to-center distance is about 10 $\mu$m.

Numerals "1s" are printed at positions under the line numbers 1 to 24 arranged in the sub-scan direction, respectively. Of those line Nos. 1 to 24, the line No. 1 does not indicate a start position of the sub-scanning operation, but it indicates a desired sub-scanning position during the course of exposure operation, as a generalization. The lines are numbered 1 to 24, 25, 26, . . . from the upstream position as viewed in the sub-scan direction. In the description, the sub-scan line No. 1 is aligned with the spot No. n (24).

Figure 6:
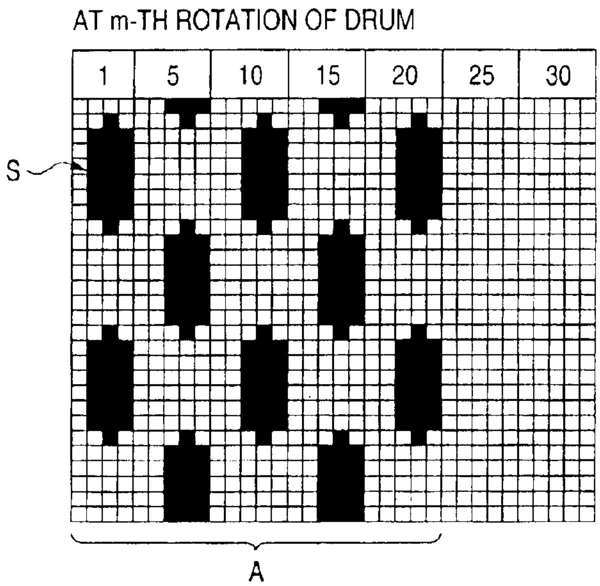
Figure 6:
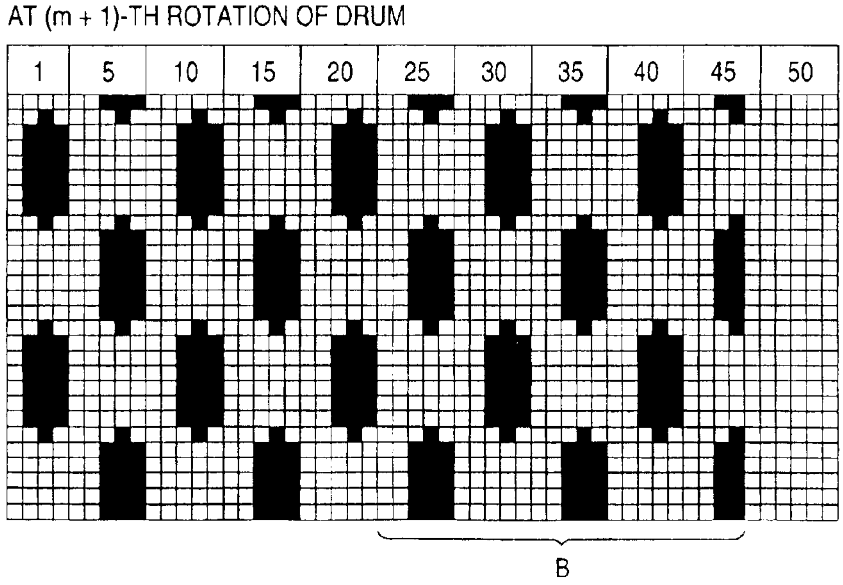
Figure 7:
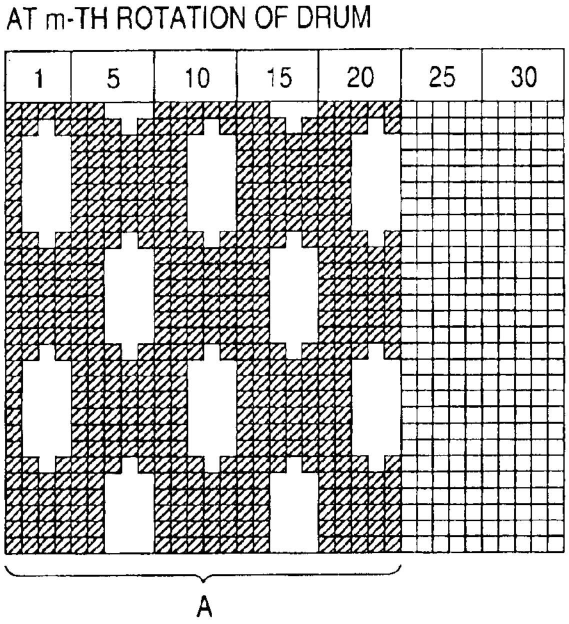
Figure 7:
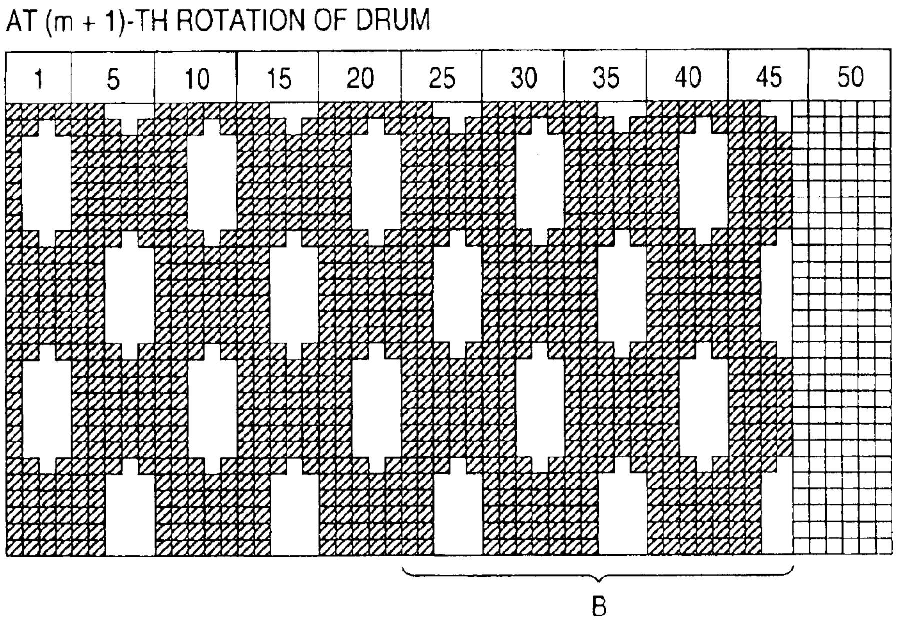

FIGS. 6 and 7 show an "island pattern exposure process" according to the first embodiment. A first exposure operation is performed while forming island patterns, by moving the recording head to a position near the end of the sub-scan (FIGS. 6(*a*) and 6(*b*)). Then, the recording head is returned to a position near the original position of the sub-scan, and an exposure operation is performed again, while forming inverted patterns (FIGS. 7(*a*) and 7(*b*)).

(1) FIG. 6(*a*) shows an exposure state on the recorded recording medium fixed to the drum at the m-th rotation of the drum. A letter S indicates an island pattern configured according to the invention. This island pattern S consists of an aggregation of "black squares" indicative of exposed pixels recorded at the m-th rotation of the drum.

Other white squares other than the island patterns S are unexposed pixels. Specifically, at the m-th rotation of the drum in the first exposure operation, an area defined by the lines Nos. 1 to 24 arrayed in the sub-scan direction (area A) are exposed by using the spots Nos. 1 to 24, to thereby form an array of island patterns as of the "black squares" of FIG. 6(*a*) in the figure.

(2) Then, at the (m+1)th rotation of the drum in the first exposure operation, an area defined by the lines Nos. 25 to 48 (area B) arrayed in the sub-scan direction are exposed by using the spots 1 to 24, to thereby form an array of island patterns as of the "black squares" of FIG. 6(*a*). An array of the island patterns is similar to that of the island patterns of the "black square" of FIG. 6(*b*) in the figure.

(3) Subsequently, the recording head is successively moved to the line No. 49 and the subsequent ones, while repeating the sequence of exposure operations mentioned above.

The recording head is moved to a position near the end position of the sub-scan, and the first exposure operation in the sub-scan direction ends.

(4) After the first exposure operation (sub-scanning operation of the recording head) ends, the recording head is returned to the original point of the sub-scan, and the recording by the second exposure operation is performed as shown in FIGS. 7(*a*) and 7(*b*).

In FIG. 7(*a*), the unexposed portion, which is thinned out in the first island pattern exposure, in the area defined by the lines Nos. 1 to 24 (area A) arrayed in the sub-scan direction are exposed as indicated by "dot" marks by using the spots Nos. 1 to 24.

(5) At the (m+1)th rotation of the drum in the second exposure operation, as in FIG. 7(*b*), an area defined by the lines Nos. 25 to 48 arrayed in the sub-scan direction (area B) are exposed as indicated by "dot" marks by using the spots Nos. 1 to 24.

Thus, when the exposed part by the first exposure operation and the exposed part by the second exposure operation are combined, a solid recording is formed. Further, the laser energy is not concentrated to the sub-scan lines No. 1 to 24 at a dash, unlike in the conventional technique, but the same lines arrayed in the sub-scan direction are exposed by plural exposure operations (two exposure operations in this instance). Accordingly, the load by the heat of the recording medium is small, and an amount of gas generated through one main scan is small.

In the first instance of the first embodiment, after the first exposure operation ends, the recording head is returned to a position near the original point in the sub-scan direction. In alternative, the recording head peforms the second exposure operation, while the recording head returns from the end point of the sub-scan direction to near the original point. The alternative gains the time taken till it returns to the original point to thereby lead to improvement of the productivity.

In the description thus far made, the "island pattern exposure process" is executed by two exposure operations, viz., the "island pattern exposure process" is executed by repeating the exposure operation two times, or the exposure operation for the "island pattern exposure process" is divided into two operations. However, it will readily be understood that the number of divisions of the exposure operation for the "island pattern exposure process" is not limited to 2, but may be 3 or R, larger 3. As the number R of divisions is increased, the productivity becomes low, but the resultant image recorded is clear with lessened image defects.

In this case, at the first exposure, a percentage of the island patterns of the whole image/character data to be exposed is preferably 20% to 80%.

At the R-th exposure, a percentage of the image/character data other than those exposed in the first to (R−1)th exposure operations to the whole image character data to be exposed is preferably 20% or higher.

Figure 8:
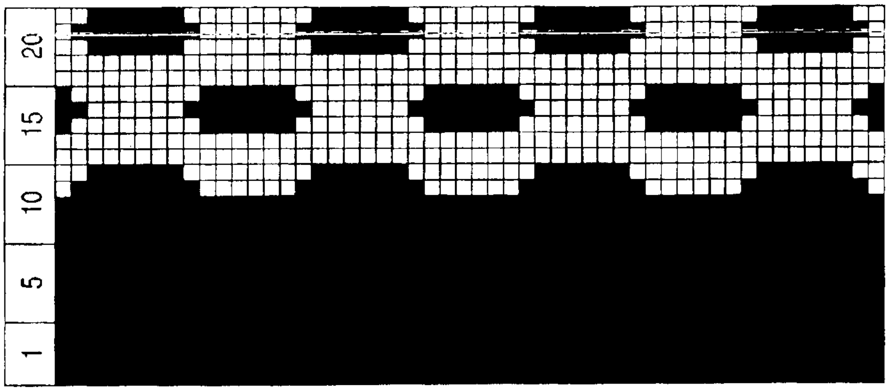
Figure 8:
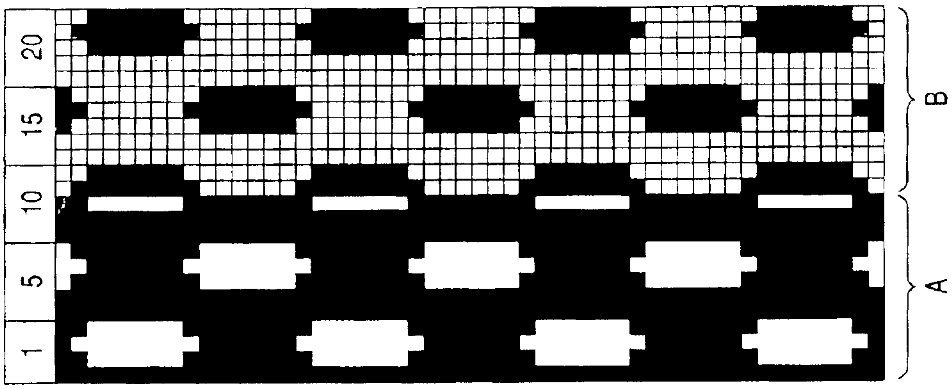
Figure 8:
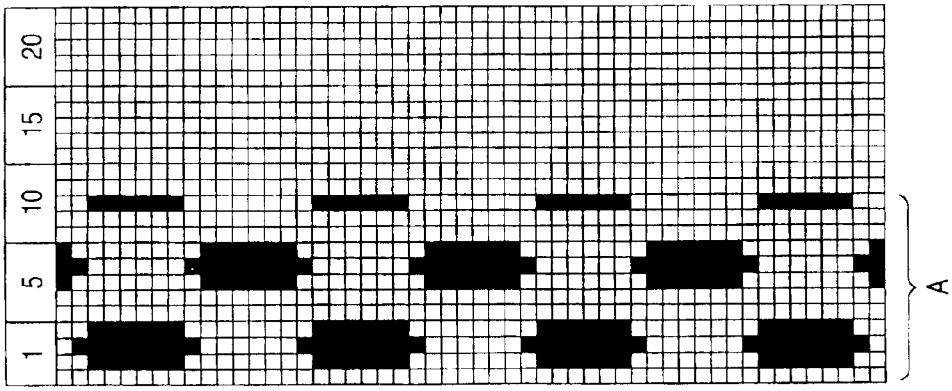

FIGS. 8(*a*), 8(*b*), and 8(*c*) are diagrams showing a second instance of the first embodiment in which the "island pattern exposure process" is executed by only one exposure operation. In the second instance, all the spots Nos. 1 to 24 by the recording head shown in FIG. 5 are divided into two blocks, a first block consisting of the spots Nos. 1 to 12, and a second block of the spots Nos. 13 to 24. The recording head is moved from the original point of the sub-scan to a position of the end thereof, while executing the "island pattern exposure process" by using the first block of spots, and executing the inversion exposure of the unexposed pixels other than the island patterns by using the second block of spots. In this case, it is preferable that the spots are equally divided into two blocks.

(1) In FIG. 8(*a*) showing an exposure state on the recorded recording medium at the m-th rotation of the drum, an area defined by the lines Nos. 1 to 12 (area A) arranged in the sub-scan direction is subjected to the "island pattern exposure process" which is carried out by using the first block (consisting of the spots Nos. 1 to 24 in FIG. 5) to thereby record a pattern of "black squares" in the figure on the recording medium.

(2) Subsequently, at the (M+1)th rotation of the drum, the recording medium is exposed to have a pattern of black parts in FIG. 8(*b*). Specifically, an area defined by the lines Nos. 13 to 24 on the recording medium (area B) are subjected to the "island pattern exposure process" which is carried out by using the first block (spots Nos. 1 to 12). The remaining portion (unexposed area) of the area defined by the lines Nos. 1 to 12 on the recording medium is subjected to the inversion exposure which is carried out by using the second block (spots Nos. 13 to 24).

Accordingly, as the result of the exposure operations at the m-th rotation and the (M+1)th rotation of the drum, a solid recording of the area defined by the lines Nos. 1 to 12 on the recording medium as indicated in FIG. 8(*c*), is completed.

Thus, the recording medium is exposed two times; a first exposure operation is executed for the area containing the island patterns on the recording medium and the other exposure operation is for the remaining area. Further, the laser energy is not concentrated, at a dash, to the sub-scan lines No. 1 to 24 arrayed in the sub-scan direction. Accordingly, the load by the heat of the recording medium is small, and an amount of gas generated through one main scanning operation is small.

In the description thus far made, the spots of the recording head is divided into two groups of spots; however, those may be divided into "n" (n=3 or larger) number of groups of spots. As the number "n" of divisions is increased, the productivity becomes low, but the resultant image recording is clear with lessened image defects.

In this case, a percentage of the island patterns, which are formed by the exposure using the first block, to the whole image character data to be exposed is preferably 20% to 80%.

At the exposure by the n-th block, a percentage of the image character data other than those exposed in the first to (n−1)th exposure operations to the whole image character data to be exposed is preferably 20% or higher.

Figure 9:
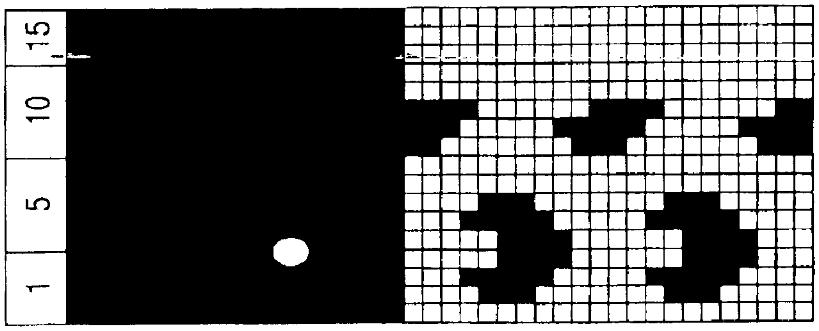
Figure 9:
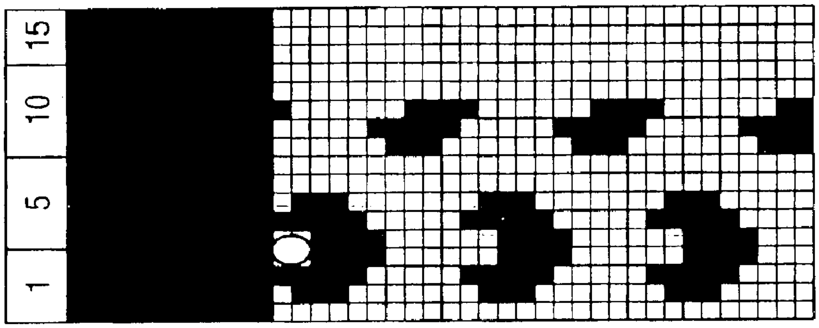
Figure 9:
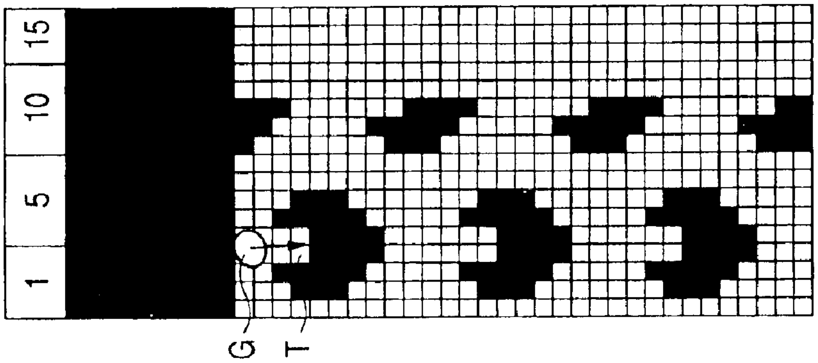
Figure 9:
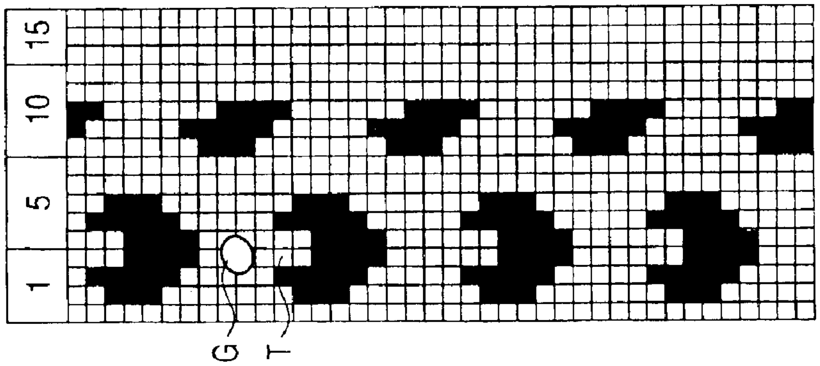

FIGS. 9(*a*), 9(*b*), 9(*c*), and 9(*d*) are diagrams for explaining a shape of an island pattern not having gas stagnation, which is a second embodiment of the invention.

At a recording local area of the recording medium, which is irradiated with the laser spots, optical energy of the laser light is instantaneously converted into thermal energy by the optical-to-thermal transducing layer. And water and organic solvent, which are contained in the optical-to-thermal transducing layer and the toner layer, are volatilized, and called gas is generated. Therefore, in the recording method in which the image receiving sheet and the transfer sheet are placed one on the other, and an acting layer acting in connection with the laser light is placed between those sheets, the gas generated is hard to run out into the air, and stays between the image receiving sheet and the transfer sheet. The island pattern of the second embodiment is configured so as not to have gas stagnation.

An island pattern shown in FIGS. 9(*a*), 9(*b*), 9(*c*), and 9(*d*) has an inappropriate shape in which gas is easy to stagnate. An island pattern contains a recessed part T which is not exposed in the preceding exposure operation by the first block, on its downstream side as viewed in the main scan direction. This part is a part at which gas will possibly stagnate. This will be described with reference to FIGS. 9(*a*), 9(*b*), 9(*c*), and 9(*d*). All the spots of the recording head are divided into two blocks of spots. The "island pattern exposure process" is executed by using the first block of spots. The unexposed pixels other than the island patterns are subjected to the inversion exposure which is carried out by using the second block of spots. FIG. 9(*a*) shows an exposure state on the recording medium when an "island pattern exposure process" of an area defined by the lines Nos. 1 to 12 arrayed in the sub-scan direction, which is carried out by using the first block (spots Nos. 13 to 24) at the m-th rotation of the drum, is completed. It is assumed that gas is generated at an areal part including the lines Nos. 4 and 5, and the ninth row.

FIG. 9(*b*) shows an exposure state on the recording medium that the exposure of the sub-scan direction proceeds to a point near the ninth row at the (m+1) rotation of the drum. In the figure, the lines Nos. 13 to 24 arrayed in the sub-scan direction are thinned out by the exposure operation using the first block (spots Nos. 13 to 24) thereby form an island pattern. When the unexposed part defined by the lines Nos. 1 to 12 arrayed in the sub-scan direction are progressively exposed, gas G appears in a part near the ninth row. In the exposed part, the image receiving sheet and the transfer sheet are in close contact with each other. Therefore, it is impossible for gas G to stagnate at the exposed part. As the exposed part moves in the main scan direction, the gas G is driven to move to the upstream side in the main scan direction. Accordingly, the gas G is driven to move in the direction of an arrow. If the recessed part T, which is not exposed by the preceding exposure operation by the first block of spots, is present in the arrow direction, the gas G will enter into the recessed part.

FIG. 9(*c*) shows a state on the recording medium when the gas G has been driven to flow into the unexposed recessed part T of the island pattern.

In turn, the gas having been put in the unexposed, recessed part T of the island pattern cannot further move forward since an upstream part in the main scan direction is not exposed. Accordingly, the gas stagnates at this recessed part.

FIG. 9(*d*) shows an exposure state on the recording medium after the island pattern containing the stagnant gas G therein has been exposed in the main scan direction. The gas trapped in the recessed part T of the island pattern hinders the close contact between the image receiving sheet and the transfer sheet, possibly causing white voids.

As seen from foregoing description, such a problem arises from the fact that the island pattern shown in FIGS. 6(*a*) and 6(*b*) includes the unexposed, recessed part on its downstream side as viewed in the main scan direction. In other words, the solution to the problem is to eliminate that recessed part. To solve the problem, what a designer has to do is to configure the island pattern so as to be flat or outcurved at its downstream side as viewed in the main scan direction.

Figure 10:
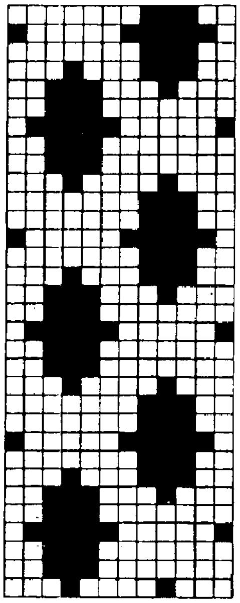
Figure 10:
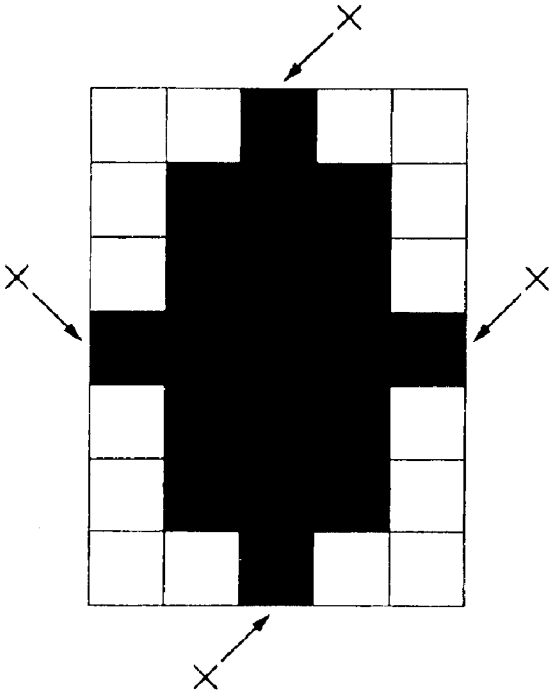
Figure 10:
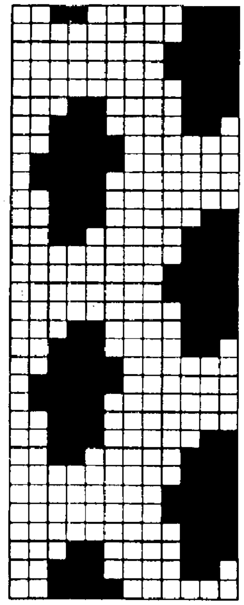
Figure 10:
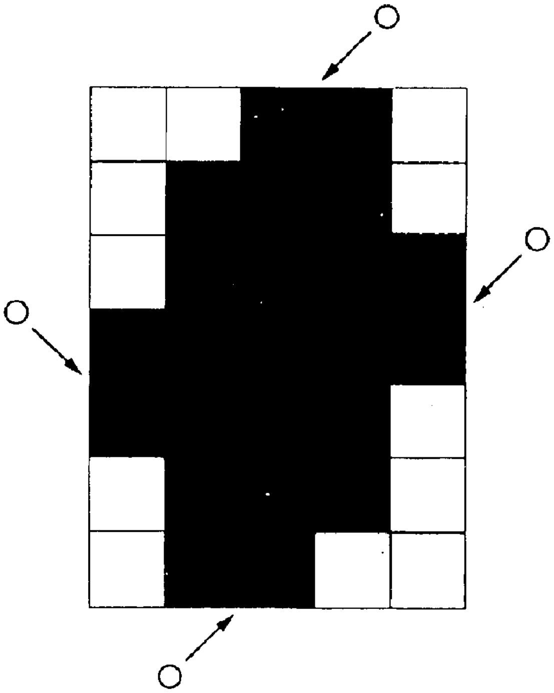

FIGS. 10(*a*), 10(*b*), 10(*c*), and 10(*d*) are explanatory diagrams for explaining an island pattern free from the pattern omission, which forms a third embodiment of the invention.

FIGS. 10(*a*) and 10(*b*) show an inappropriate island pattern in which the omission of pattern is easy to occur. FIG. 10(*a*) shows its island pattern, and FIG. 10(*b*) shows the same in an enlarged fashion. FIGS. 10(*c*) and 10(*d*) show an example of the island pattern free from the pattern omission phenomenon, which forms a third embodiment of the invention. FIG. 10(*c*) shows its island pattern, and FIG. 10(*d*) shows the same in an enlarged fashion.

In FIG. 10(*a*), as shown in the enlarged view of FIG. 10(*b*), each island pattern includes a 1-dot protruded part (X part), which is protruded from each of the four sides of the island pattern by a distance of one dot. It was found that the protruded part causes the pattern omission. The reason for this follows. The area around the three sides of the top, bottom, right and left sides of the one-dot protruded part is the unexposed part and cold. Accordingly, if one dot protruded part is exposed, the resultant heat dissipates in three directions. As a result, the pattern omission phenomenon occurs.

Island patterns shown in FIG. 10(*c*), as shown in FIG. 10(*d*) of the same figure in an enlarged manner, each island pattern includes two-dot protruded parts (marked with circles) each protruded from its four sides by a distance of two or more dots, not the one-dot protruded parts. With provision of the two-dot protruded parts, there is eliminated the pattern omission. The reason for this is reverse to the reason for the pattern omission previously stated. In this island pattern, the cold area is the area adjacent to only two sides of the top, bottom, right and left sides of each two-dot protruded part. Accordingly, the recording local area can be heated to a temperature necessary for image transferring.

As seen from the description of the third embodiment, it is preferable to configure the island pattern such that at least two sides of the island pattern have recording dots.

Figure 11:
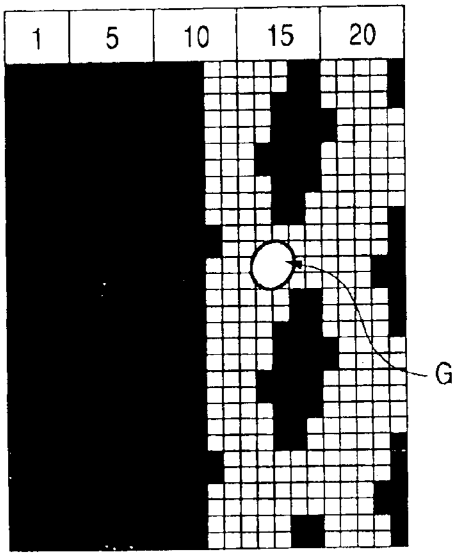
Figure 11:
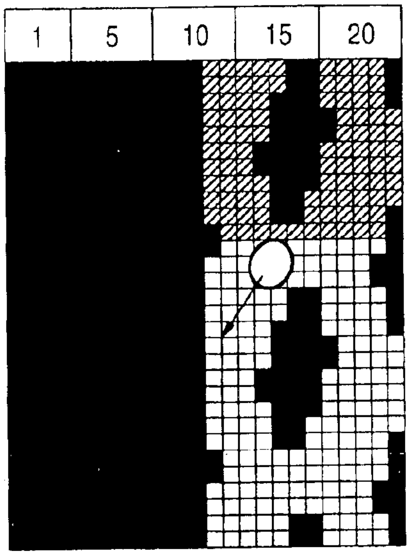
Figure 11:
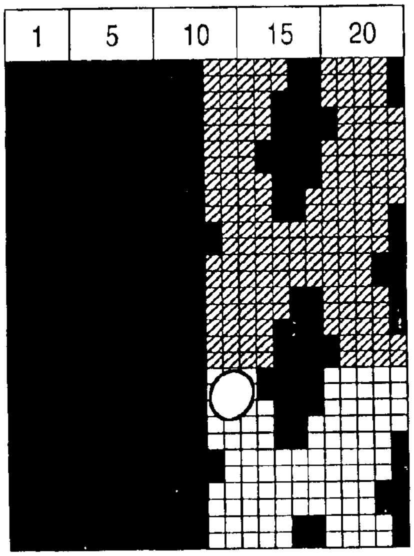
Figure 11:
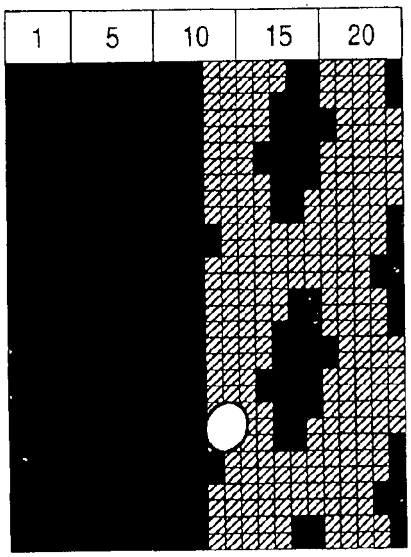
Figure 12:
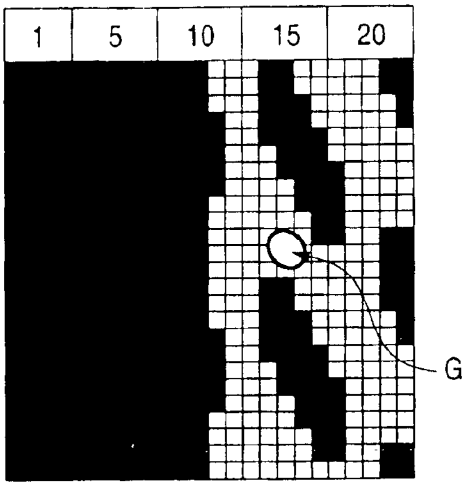
Figure 12:
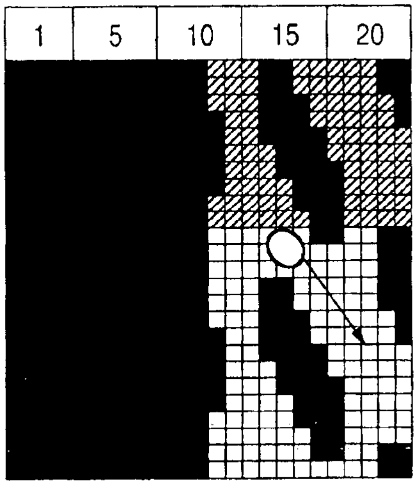
Figure 12:
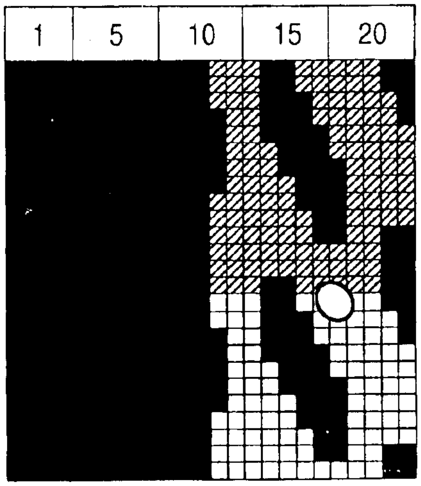
Figure 12:
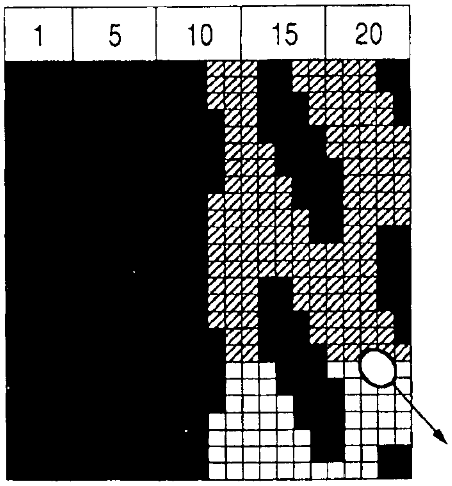

FIGS. 11 and 12 show diagrams useful in explaining a fourth embodiment of the invention. FIGS. 11(*a*), 11(*b*), 11(*c*), and 11(*d*) are explanatory diagrams for explaining an inappropriate island pattern which blocks the flowing of gas generated in the preceding thin-out exposure operation to the outside of the recording medium. FIGS. 12(*a*), 12(*b*), 12(*c*), and 12(*d*) are diagrams showing a fourth embodiment of the invention, which defines island patterns enabling the flowing of gas generated in the preceding thin-out exposure operation to smoothly flow out of the recording medium.

FIG. 11(*a*) shows an exposure state of the recording medium when the (M+1)th rotation of the drum ends, and a solid recording in an area defined by the lines Nos. 1 to 12 arrayed in the sub-scan direction, which is performed by using the second block (spots Nos. 13 to 24), is completed, and an “island pattern exposure process” of an area defined by the lines Nos. 13 to 24 arrayed in the sub-scan direction, which is performed using the first block (spots Nos. 1 to 12), is completed. It is assumed that at this time, gas indicated by G is generated at a part including the lines Nos. 16 to 17, and the rows Nos. 12 to 14.

FIG. 11(*b*) shows an exposure state on the recording medium that the solid recording (dotted area) has reached a position near the 11th line in the main scan direction at the (M+2)th rotation of the drum. In the figure, an area defined by lines Nos. 13 to 24 arrayed in the sub-scan direction is inversion exposed by using the second block (spots Nos. 13 to 24), whereby the solid recording is executed. The recording process under progression encounters the gas G. In the exposed part, the image recording sheet and the transfer sheet are in close contact with each other. Accordingly, the gas G cannot stagnate in the exposed part, and this part functions to drive the gas G to move in the main scan direction. The island pattern is configured such that as the recording head moves in the main scan direction, the gas G is driven to move upstream in the sub-scan direction (=an arrow direction). Accordingly, the gas G flows to the already exposed area located upstream in the sub-scan direction, as shown in FIG. 11(*c*). And the gas G is trapped at a recorded part where the exposure is completed as indicated in FIG. 11(*d*), possibly forming a void.

Turning to FIGS. 12(*a*), 12(*b*), 12(*c*), and 12(*d*), there is shown an island pattern which allows the gas to move outside the recording medium. FIG. 12(*a*) shows an exposure state on the recording medium that the rotation of the (m+1)th rotation of the drum ends, and the solid recording on an area defined by the lines Nos. 1 to 12 arrayed in the sub-scan is completed by using the second block (spots Nos. 13 to 24), and an “island pattern exposure process” of an area defined by the lines Nos. 13 to 24 arrayed in the sub-scan direction, which the process is carried out using the first block (spots Nos. 1 to 12), is completed. It is assumed that at this time, gas is generated at an areal part including the lines Nos. 16 to 17, and the 12th to 14th rows.

FIG. 12(*b*) shows an exposure state on the recording medium that the solid recording proceeds to a point near the 11th row as viewed in the sub-scan direction at the (m+2) rotation of the drum. In the figure, an area defined by lines Nos. 13 to 24 arrayed in the sub-scan direction is inversion exposed by using the second block (spots Nos. 13 to 24), whereby the solid recording is executed. The recording process under progression encounters the gas G. In the exposed part, the image recording sheet and the transfer sheet are in close contact with each other. Accordingly, the gas G cannot stagnate in the exposed part, and this part function to drive the gas G to move upstream as viewed in the main scan direction. The island pattern is configured such that as the recording head moves in the main scan direction, the gas G is driven to move downstream in the sub-scan direction. Accordingly, the gas G moves to the unexposed part located downstream in the sub-scan direction indicated by an arrow. Accordingly, the gas G moves as shown in FIG. 12(*c*), and further moves to the unexposed part located upstream in the main stream and downstream in the sub-scan direction, and finally it is discharged from the end of the recording medium to exterior, as shown in FIG. 12(*d*).

As described above, it is seen from the third embodiment of the invention that a preferable island pattern is configured to be slanted to the downstream side in the sub-scan direction, and to the upstream side in the main scan direction.

It is also seen that for the same reason, an array of plural island patterns is preferably directed to the downstream side in the sub-scan direction and to the upstream in the main scan direction.

When the island pattern is so configured and the island patterns are arrayed as mentioned above, there is no chance that the gas stagnates between the toner layer 240*c* (FIG. 3) and the image receiving layer 140*c* in the recorded area, the close contact between the toner layer 240*c* and the image receiving layer 140*c* is maintained, and the image defect arising from the spot array is prevented.

The exposure method effectively operates when the dot area rate is 70% or higher, particularly for the solid part (where the dot area rate is 100%).

Figure 13:
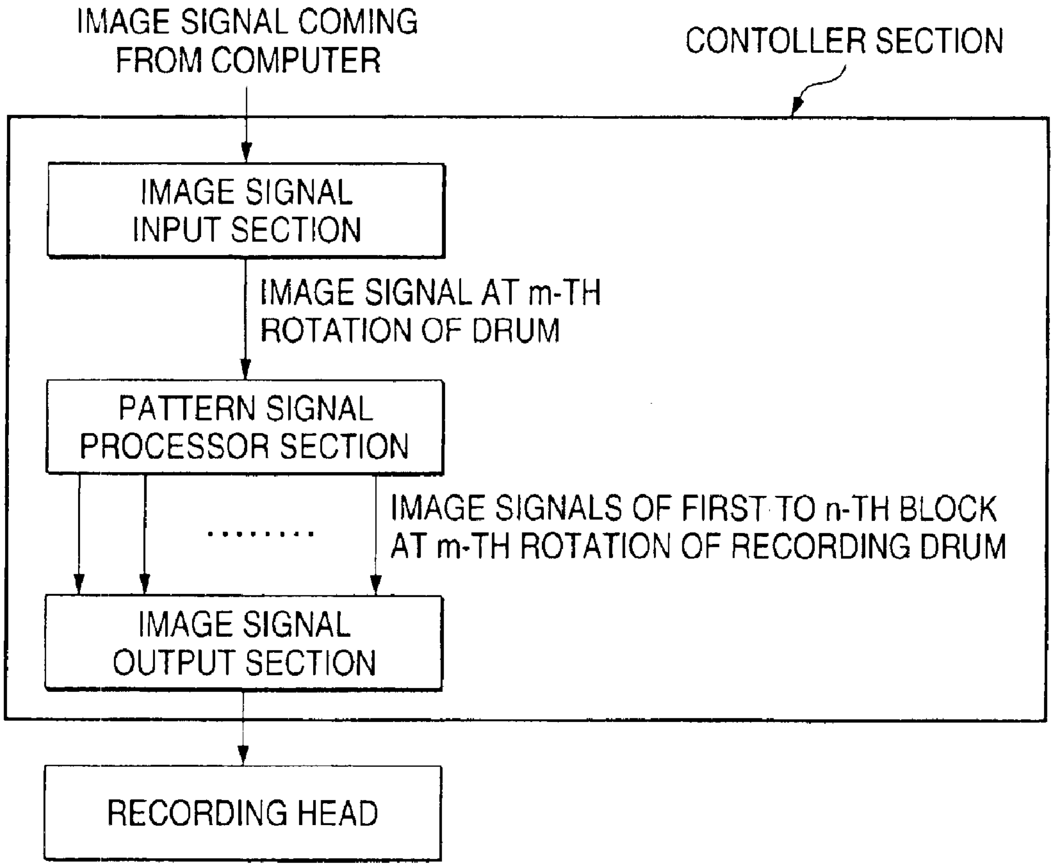
FIG. 13 is a block diagram showing a process in which an image signal coming from a computer is processed and an image signal to be applied to the recording head is generated, FIGS. 14(*a*), 14(*b*), 14(*c*), 14(*d*), and 14(*e*) are diagrams showing image data the blocks in FIG. 13.

FIG. 13 is a block diagram showing a process in which an image signal coming from a computer is processed and an image signal to be applied to the recording head is generated.

1) An image signal coming from a computer is input to an image signal input section in the controller section. An image signal from the computer takes a form as shown in FIG. 14(*a*).
2) The image signal input section takes out an image signal of the m-th rotation of the drum from the image signal coming from the computer, and sends it to a pattern signal processor section.
3) The pattern signal processor section computes the image signals of the first to n-th blocks of the m-th rotation of the drum, and sends it to an image signal output section.
4) The image signal output section drives the recording head for exposure in accordance with the incoming image signals.

Figure 14:
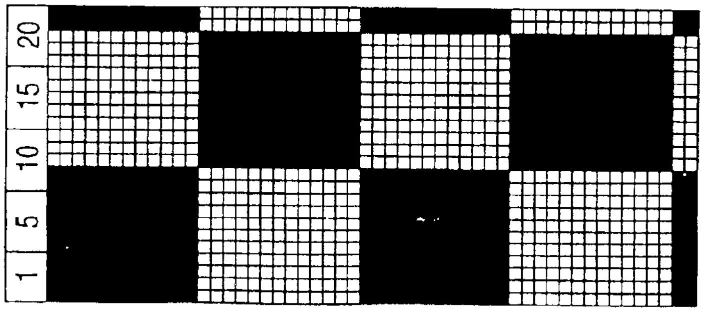
Figure 14:
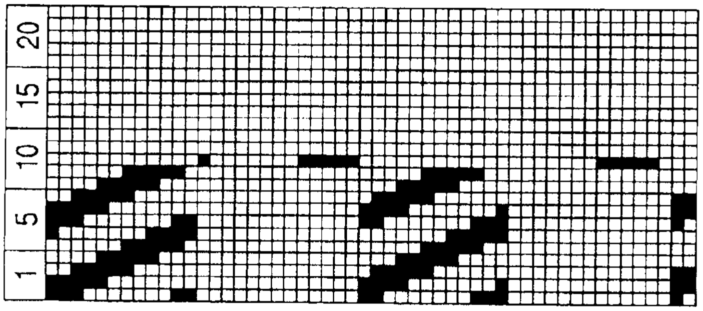
Figure 14:
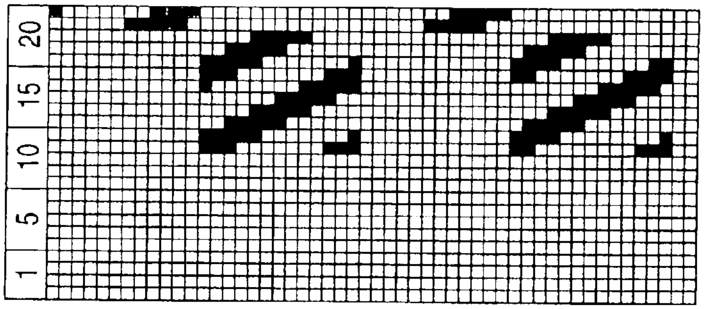
Figure 14:
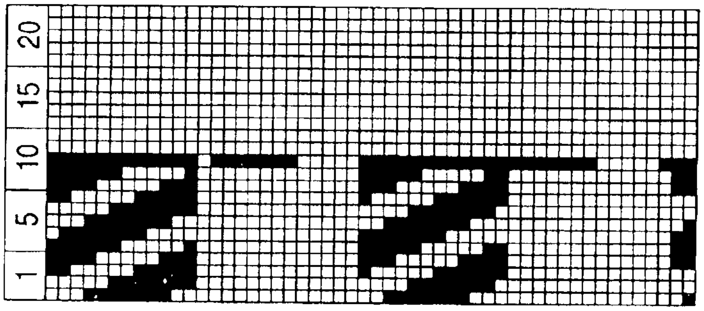
Figure 14:
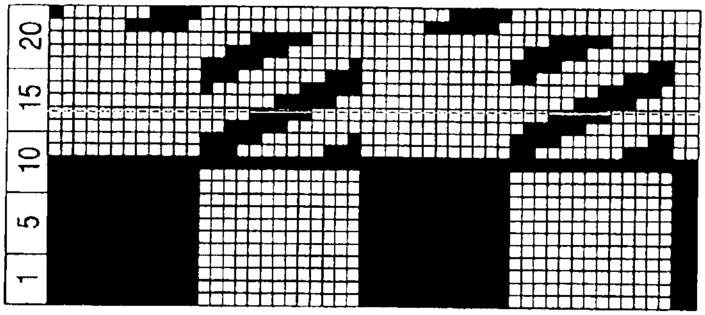
Figure 15:
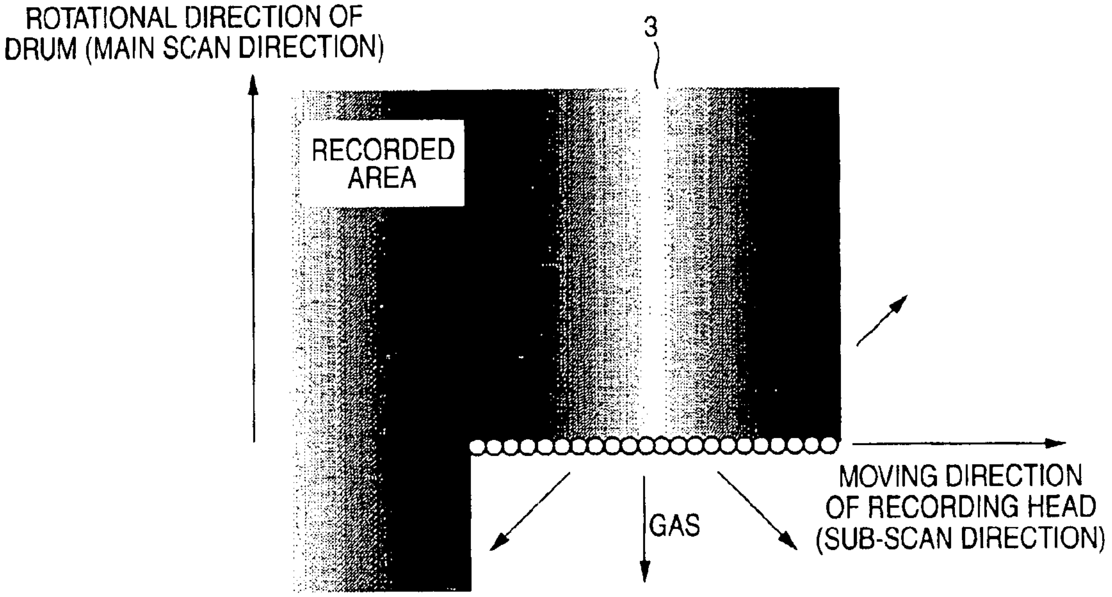
FIG. 15 is a diagram showing an array of spots of laser light irradiated by the conventional recording method, FIGS. 16(*a*), 16(*b*), and 16(*c*) are diagrams showing exposure states on the recording medium at the m-th to (m+2)th rotation of the drum in a first instance of the fifth embodiment according to the invention, FIGS. 17(*a*), 17(*b*), and 17(*c*) are diagrams, subsequent to FIG. 6(*c*), showing exposure states on the recording medium at the (m+3)th to (m+5)th rotation of the drum, FIGS. 18(*a*), 18(*b*), and 18(*c*) are diagram showing exposure states on the recording medium at the m-th to (m+2)th rotation of the drum in a second instance of the fifth embodiment according to the invention, FIGS. 19(*a*), 19(*b*), and 19(*c*) are diagrams, subsequent to FIG. 18(*c*), showing exposure states on the recording medium at the (m+3)th to (m+5)th rotation of the drum, FIGS. 20(*a*), 20(*b*), 20(*c*), 20(*d*), 20(*e*), and 20(*f*) are diagrams useful in explaining the direction of the "thin-out exposure process" according to the invention, FIGS. 21(*a*) and 21(*b*) are tables showing a spot array of laser light in a conventional "sub-scan direction thin-out exposure" type of the interlace recording technique, FIGS. 22(*a*) and 22(*b*) are tables showing a spot array of laser light in a conventional "main scan direction thin-out exposure" type of the interlace recording technique, FIGS. 23(*a*), 23(*b*), and 23(*c*) are diagrams showing a first exposure operation in a "thin-out exposure process" according to the sixth embodiment of the invention, FIGS. 24(*a*), 24(*b*), and 24(*c*) are diagrams showing a second exposure operation in the "thin-out exposure process" according to the sixth embodiment of the invention, FIGS. 25(*a*), 25(*b*), 25(*c*), 25(*d*), 25(*e*), and 25(*f*) are diagrams for explaining the thinning-out direction in the second embodiment of the invention.

FIGS. 14(*b*), 14(*c*), 14(*d*), and 14(*e*) are diagrams showing a process in which the image signal as shown in FIG. 14(*a*) is exposed in a thin-out manner and recorded according to the invention. FIG. 14(*b*) shows image data of the first block oft the m-th rotation of the drum. As seen, the recording medium is exposed in thin-out patterns, which are slanted to the downstream side in the sub-scan direction and to the upstream side in the main scan direction.

FIG. 14(*c*) shows image data of the first block of the (m+1)th rotation of the drum.

FIG. 14(*d*) shows image data of the second block produced of the (m+1)th rotation of the drum.

As seen, those patterns are slanted to the downstream side in the sub-scan direction and to the upstream side in the main scan direction, and are used for exposing the unexposed area which is thinned out in FIG. 14(*b*).

FIG. 14(*e*) show an exposed area defined by the lines Nos. 1 to 12 arrayed in the sub-scan direction, which has undergone the exposure operations of FIGS. 14(*b*), 14(*c*) and 14(*d*). As seen, the image signal coming from the computer is clearly recorded without any gas stagnation, in the form of the same image as of the area defined by the lines Nos. 1 to 12 in FIG. 14(*a*).

In the embodiments mentioned above, the recording medium fixing member of the outer drum type is presented by way of example. It may be of the inner drum type in which the recording medium is fixed to the incurved surface or the inner peripheral surface of a cylinder, and a laser beam is emitted, for recording, from the center of incurved surface or the cylinder. A recording device of the type in which a laser beam is moved in the main scan direction, and the recording medium is transported in the sub-scan direction by means of a transporting mechanism, may also be used instead of the drum. The recording medium fixing member may be of the flat table type in which it is movable in the main scan direction. While the laser light spots one dimensionally arrayed are used in the embodiments, the laser beam spots two dimensionally arrayed may also be used instead.

As seen from the foregoing description, in the recording method and recording apparatus of the invention, in the first exposure operation in which the recording head is moved from the original point in the sub-scan direction to a position near the end point of the same, the image/character data is exposed by the "island pattern exposure process". In the first exposure operation and the subsequent ones, the pixels in the unexposed area other than the area island pattern exposure processed are successively exposed. Accordingly, the thermal energy is dispersed, and the load by the heat of the recording medium is small.

Gas generated at a local area of the recording medium is successively moved to the downstream part in the sub-scan direction and the upstream part in the main scan direction, and moved to the non-recorded area, and finally discharged outside the recording medium. As a result, the invention prevents the gas from stagnating between the toner layer and the image receiving layer, and succeeds in eliminating the cause of the image defect.

Figure 16:
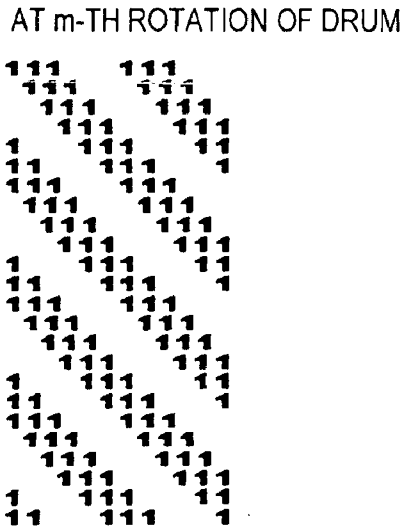
Figure 16:
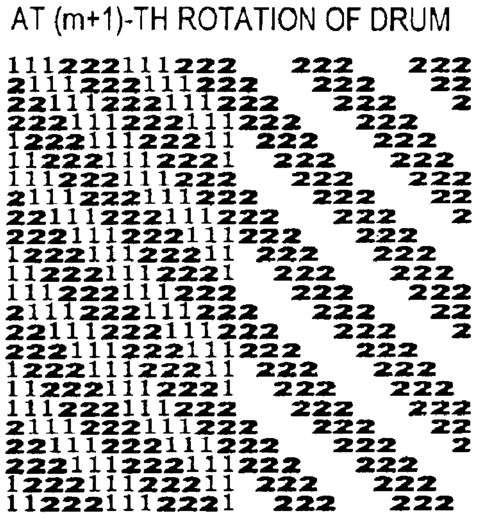
Figure 16:
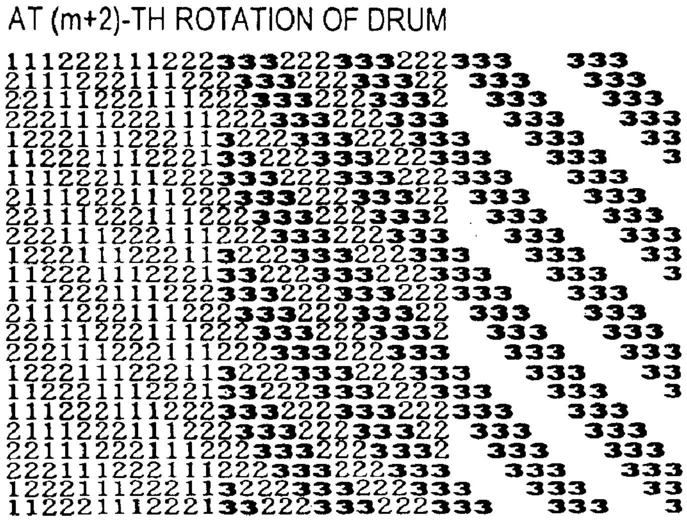

FIGS. 16(*a*), 16(*b*), 16(*c*), 17(*a*), 17(*b*), and 17(*c*) are diagrams showing a first instance of the fifth embodiment in which the exposure process is executed by only one exposure operation. In the first instance, all the spots Nos. 1 to 24 by the recording head shown in FIG. 5 are divided into two blocks, a first block consisting of the spots Nos. 1 to 12, and a second block of the spots Nos. 13 to 24. The recording head is moved from the original point of the sub-scan to a position of the end point thereof, while executing the "thin-out exposure process" by using the first block of spots, and executing the inversion exposure of the pixels remaining unexposed after the execution of the "thin-out exposure process", by using the second block of spots. In this case, it is preferable that the spots are equally divided into two blocks.

(1) FIG. 16(*a*) showing an exposure state on the recorded recording medium at the m-th rotation of the drum, an area defined by the lines Nos. 1 to 12 arranged in the sub-scan direction is subjected to the "thin-out exposure process" using the first block (consisting of the spots Nos. 13 to 24) to thereby record patterns of "1" on the recording medium as shown.
(2) Subsequently, at the (M+1)th rotation of the drum, the recording medium is exposed to have patterns of "2" in FIG. 16(*b*). Specifically, an area defined by the lines Nos. 13 to 24 on the recording medium are subjected to the "thin-out exposure process" using the first block (spots Nos. 1 to 12). The remaining part (unexposed area) of the area defined by the lines Nos. 1 to 12 on the recording medium is subjected to the inversion exposure using the second block (spots Nos. 13 to 24), and a solid recording of this area is completed.

(3) At the (M+2)-th rotation of the drum, the recording medium is exposed to have patterns of "3" in FIG. 16(*c*). Specifically, an area defined by the lines Nos. 25 to 36, which are arrayed in the sub-scan direction, on the recording medium is subjected to the "thin-out exposure process" using the first block (spots Nos. 1 to 12). An unexposed area of the area defined by the lines Nos. 13 to 24, which are arrayed in the sub-scan direction, on the recording medium is exposed to have patterns of "3", by the second block (spots Nos. 13 to 24).

Figure 17:
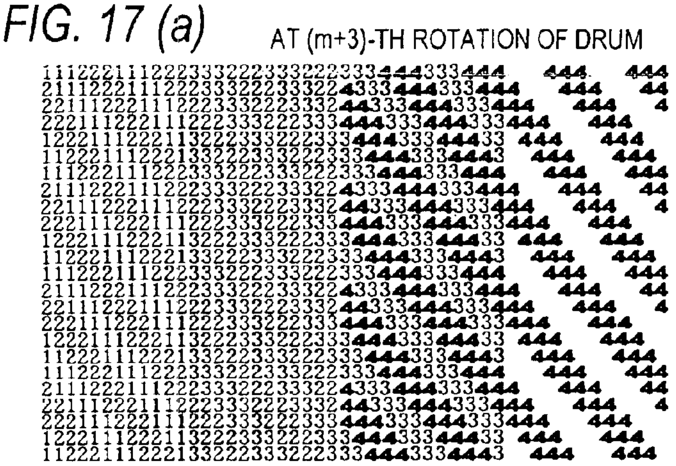
Figure 17:
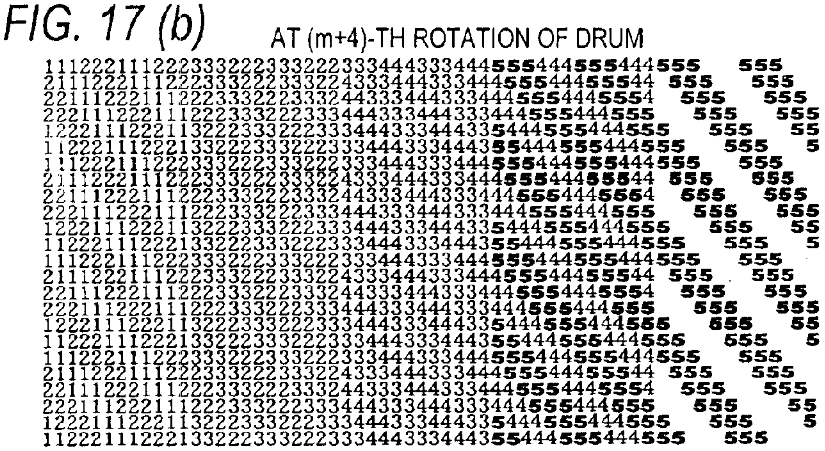
Figure 17:
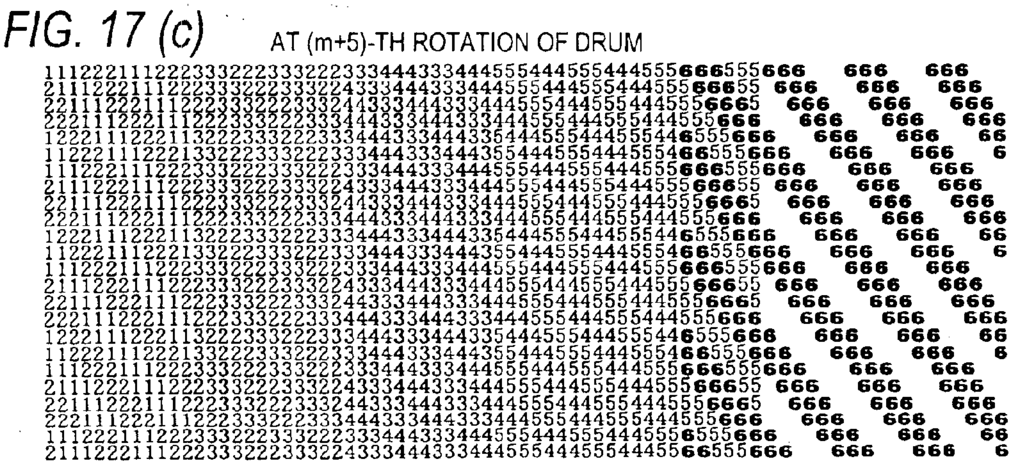

(4) At the (M+3)-th rotation of the drum, the recording medium is exposed to have patterns of "4" in FIG. 17(*a*). Specifically, an area defined by the lines Nos. 37 to 48, which are in the sub-scan direction, on the recording medium are subjected to the "thin-out exposure process" using the first block (spots Nos. 1 to 12). An unexposed area of the area defined by the lines Nos. 25 to 36, which are arrayed in the sub-scan direction, on the recording medium is subjected to the inversion exposure to have patterns of "4" using the second block (spots Nos. 13 to 24), and a solid recording of this area is completed.

(5) At the (M+4)-th rotation of the drum, the recording medium is exposed to have patterns of "5" in FIG. 17(*b*). Specifically, an area defined by the lines Nos. 49 to 60, which are arrayed in the sub-scan direction, on the recording medium are subjected to the "thin-out exposure process" using the first block (spots Nos. 1 to 12). An unexposed area of the area defined by the lines Nos. 37 to 48, which are arrayed in the sub-scan direction, on the recording medium is subjected to the inversion exposure to have patterns of "5" using the second block (spots Nos. 13 to 24), and a solid recording of this area is completed.

(6) At the (M+5)-th rotation of the drum, the recording medium is exposed to have patterns of "6" in FIG. 7(*c*). Specifically, an area defined by the lines Nos. 61 to 72, which are arrayed in the sub-scan direction, on the recording medium are subjected to the "thin-out exposure process" using the first block (spots Nos. 1 to 12). An unexposed area of the area defined by the lines Nos. 49 to 60, which are arrayed in the sub-scan direction, on the recording medium is subjected to the inversion exposure to have patterns of "6", the exposure being carried out using the second block (spots Nos. 13 to 24), and a solid recording of this area is completed.

Thus, an array of pixels to be thinned out is directed to the downstream side in the sub-scan direction and to the upstream in the main scan direction. Therefore, the laser energy is not concentrated to the sub-scan lines No. 1 to 24 at a dash, but the same lines arrayed in the sub-scan direction are exposed by plural exposure operations. Accordingly, the load by the heat of the recording medium is small.

Gas that is generated in the exposure operation by the first block (spots Nos. 1 to 12) stagnates in spaces of the thinned-out part of the recording medium. The gas that is generated in the exposure operation by the second block (spots Nos. 13 to 24) and gas having been stagnated are both driven to move upstream in the main scan direction and downstream in the sub-scan direction with the progress of the exposure operation. Finally, those gases are discharged from the ends of the recording medium to exterior. As a result, there is no chance that the gas stagnates between the toner layer 240*c* and the image receiving layer 140*c* in the already recorded area, the close contact between the toner layer 240*c* and the image receiving layer 140*c* is maintained, and formation of the image defect based on the spot array is prevented. This will be described later in detail with reference to FIGS. 20(*a*), 20(*b*), 20(*c*), 20(*d*), 20(*e*), and 20(*f*).

Figure 18:
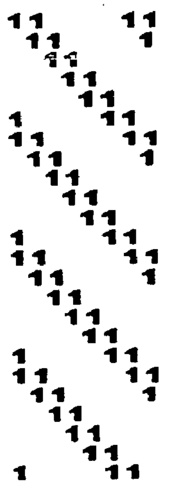
Figure 18:
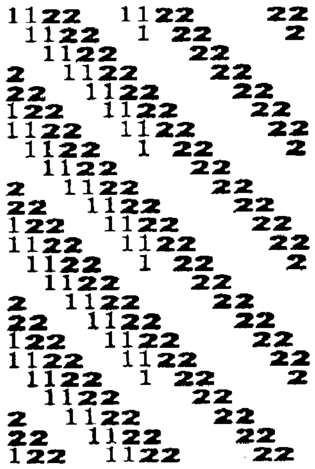
Figure 18:
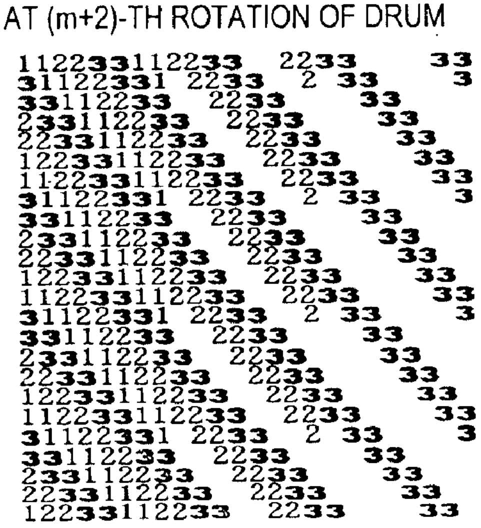

FIGS. 18(*a*), 18(*b*), and 18(*c*) are diagrams showing a second instance of the fifth embodiment in which the exposure process is executed by only one exposure operation in a manner that all the spots by the recording head are divided into "n" blocks. Specifically, all the spots by the recording head are divided into "n" blocks (preferably, those spots are equally divided). The "thin-out exposure" is carried out by using the fist block of spots. The unexposed area (not the whole) on the recording medium is gradually exposed by using the second to (n−1)-th blocks of spots. Finally, the remaining unexposed area on the recording medium is exposed by using the n-th block of spots.

Description will be given about a case where the spots are divided into three blocks of spots.

In FIG. 5, 24 number of laser spots are substantially horizontally arrayed, and a distance between the center of one laser spot to the center of another laser spot adjacent to the former is about 10 μm. Of those spots, the spots Nos. 1 to 8 form a third block, the spots Nos. 9 to 16 form a second block, and the spots Nos. 17 to 24 form a first block, and the exposure process is executed by one exposure operation.

(1) FIG. 18(*a*) showing an exposure state on the recorded recording medium at the m-th rotation of the drum, an area defined by the lines Nos. 1 to 8 arranged in the sub-scan direction is subjected to the "thin-out exposure process" using the first block (consisting of the spots Nos. 17 to 24) to thereby record patters of "1" on the recording medium, as shown.

(2) Subsequently, at the (M+1)-th rotation of the drum, the recording medium is exposed to have patterns of "2" in FIG. 18(*b*). Specifically, an area defined by the lines Nos. 9 to 16 arrayed in the sub-scan direction on the recording medium is subjected to the "thin-out exposure process" using the second block (spots Nos. 9 to 16). A half of the remaining part (unexposed area) of the area defined by the lines Nos. 1 to 12 on the recording medium is subjected to the "thin-out exposure process" using the first block (spots Nos. 17 to 24).

(3) At the (M+2)-th rotation of the drum, the recording medium is exposed to have patterns of "3" in FIG. 8(*c*). Specifically, an area defined by the lines Nos. 17 to 24 arrayed in the sub-scan direction on the recording medium are subjected to the "thin-out exposure process" using the third block (spots Nos. 1 to 8). A half of the remaining part (unexposed area) of the area defined by the lines Nos. 9 to 16, which are arrayed in the sub-scan direction, on the recording medium is subjected to the "thin-out exposure process" using the second block (spots Nos. 9 to 16). The remaining part (unexposed area) of the area defined by the lines Nos. 1 to 12 on the recording medium is subjected to the inversion exposure using the first block (spots Nos. 17 to 24), and a solid recording of this area is completed.

By so doing, gas that is generated in the area defined by the lines Nos. 1 to 8 arrayed in the sub-scan direction during the exposure operation, flows to the area defined by the lines Nos. 9 to 16 arrayed in the sub-scan direction. As a result, there is no chance that the gas stagnates in the area defined by the lines Nos. 1 to 8 arrayed in the sub-scan direction.

Figure 19:
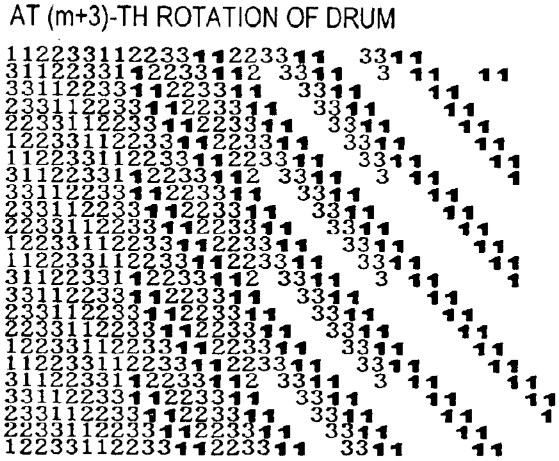
Figure 19:
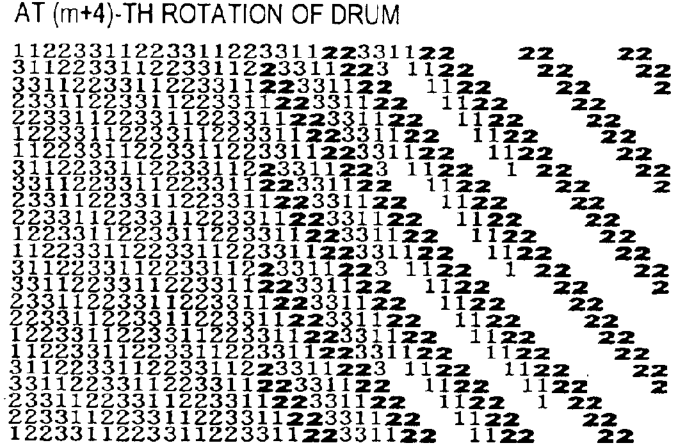
Figure 19:
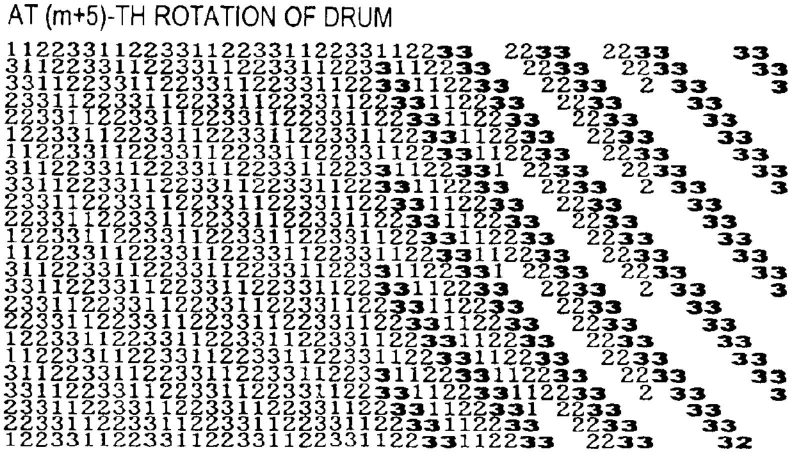

(4) At the (M+3)-th rotation of the drum, the recording medium is exposed to have patterns of "1" in FIG. 19(*a*).

Specifically, an area defined by the lines Nos. 25 to 32, which are arrayed in the sub-scan direction, on the recording medium are subjected to the "thin-out exposure process" using the third block (spots Nos. 1 to 8). A half of the remaining part (unexposed area) of the area defined by the lines Nos. 17 to 24, which are arrayed in the sub-scan direction, on the recording medium is subjected to the "thin-out exposure process" using the second block (spots Nos. 9 to 16). The remaining part (unexposed area) of the area defined by the lines Nos. 9 to 16 on the recording medium is subjected to the inversion exposure using the first block (spots Nos. 17 to 24), and a solid recording of this area is completed.

By so doing, gas that is generated in the area defined by the lines Nos. 9 to 16, which are arrayed in the sub-scan direction, during the exposure operation, flows to the area defined by the lines Nos. 17 to 24 in the sub-scan direction. Accordingly, there is no chance that the gas stagnates in the area defined by the lines Nos. 9 to 16 in the sub-scan direction.

(5) At the (M+4)-th rotation of the drum, the recording medium is exposed to have patterns of "2" in FIG. 19(*b*). Specifically, an area defined by the lines Nos. 33 to 40, which are arrayed in the sub-scan direction, on the recording medium are subjected to the "thin-out exposure process" using the third block (spots Nos. 1 to 8). A half of the remaining part (unexposed area) of the area defined by the lines Nos. 25 to 32, which are arrayed in the sub-scan direction, on the recording medium is subjected to the "thin-out exposure process" using the second block (spots Nos. 9 to 16). The remaining part (unexposed area) of the area defined by the lines Nos. 17 to 24 on the recording medium is subjected to the inversion exposure using the first block (spots Nos. 17 to 24), and a solid recording of this area is completed.

By so doing, gas that is generated in the area defined by the lines Nos. 17 to 24, which are arrayed in the sub-scan direction, during the exposure operation, flows to the area defined by the lines Nos. 25 to 32 in the sub-scan direction. Accordingly, there is no chance that the gas stagnates in the area defined by the lines Nos. 17 to 24 in the sub-scan direction.

(6) At the (M+5)-th rotation of the drum, the recording medium is exposed to have patterns of "3" in FIG. 19©. Specifically, an area defined by the lines Nos. 41 to 48 arrayed in the sub-scan direction on the recording medium is subjected to the "thin-out exposure process" using the third block (spots Nos. 1 to 8). A half of the remaining part (unexposed area) of the area defined by the lines Nos. 33 to 40 arrayed in the sub-scan direction on the recording medium is subjected to the "thin-out exposure process" using the second block (spots Nos. 9 to 16). The remaining part (unexposed area) of the area defined by the lines Nos. 25 to 32 on the recording medium is subjected to the inversion exposure using the first block (spots Nos. 17 to 24), and a solid recording of this area is completed.

By so doing, gas that is generated in the area defined by the lines Nos. 25 to 32 in the sub-scan direction during the exposure operation, flows to the area defined by the lines Nos. 33 to 40 in the sub-scan direction. Accordingly, there is no chance for the gas to stagnate in the area defined by the lines Nos. 25 to 32 in the sub-scan direction.

Figure 20:
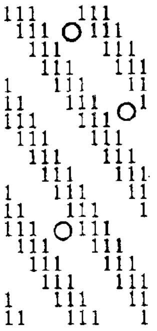
Figure 20:
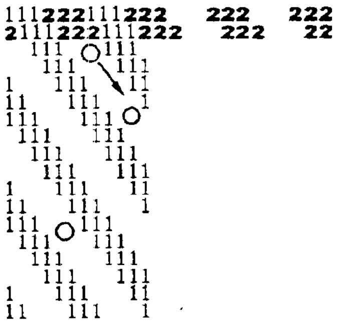
Figure 20:
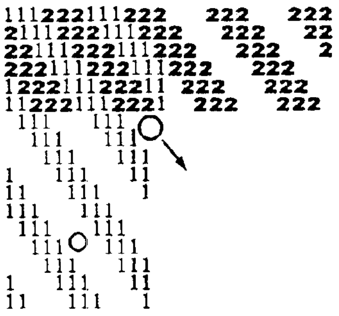
Figure 20:
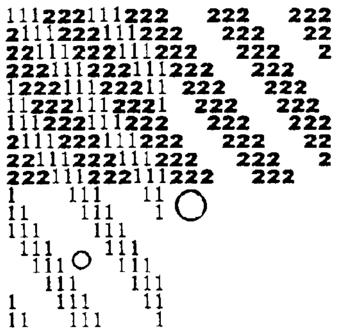
Figure 20:
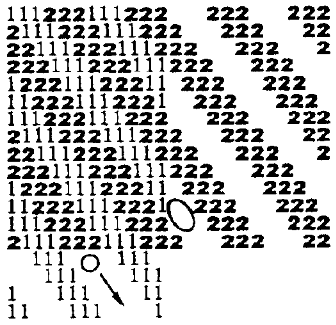
Figure 20:
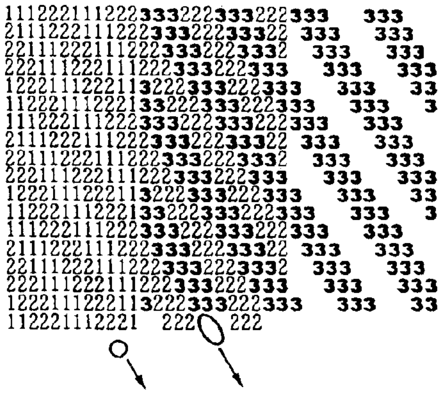

FIGS. 20(*a*), 20(*b*), 20(*c*), 20(*d*), 20(*e*), and 20(*f*) are diagrams useful in explaining the direction of the "thin-out exposure process" of the first embodiment, and exemplarily showing a case where the exposure patterns are obliquely recorded. As executed in the first embodiment, a pattern to be recorded is slanted to the downstream side in the sub-scan direction and to the upstream side in the main scan direction. Where the so recorded pattern is employed, the exposure operation is performed while driving the gas generated in the exposure operation to move downstream in the sub-scan direction. Consequently, the recording operation is performed with no gas stagnation and no density lowered part.

FIGS. 20(*a*), 20(*b*), 20(*c*), 20(*d*), 20(*e*), and 20(*f*) exemplarily show a case where gas is generated in the two-divided exposure as described referring to FIGS. 16(*a*), 16(*b*), and 16(*c*).

(1) FIG. 20(*a*) shows an exposure state on the recording medium when the exposure operation at the m-th rotation of the drum is completed and an exposure operation at the (m+1)-th rotation of the drum, is ready to start. An area defined by the lines Nos. 1 to 12 arrayed in the sub-scan direction is subjected to the "thin-out exposure process" using the first block (spots Nos. 13 to 24) to thereby record patterns of "1" on the recording medium, as shown. It is assumed that gas (each denoted as circle) is generated in the recording operation m-th rotation of the drum, and the gas stagnates at three positions in the unexposed part on the recording medium.

(2) FIG. 20(*b*) shows an exposure state on the recording medium that the recording has reached a position of the 2nd line in the main scan direction at the (M+1)-th rotation of the drum. Of those gases stagnating at the three positions, the gas located most downstream in the main scan direction is driven to move in an arrow direction as the result of the patterns of "2" arrayed in the sub-scan direction, viz., it is moved to an unexposed part located downstream in the sub-scan direction and upstream in the main scan direction. The reason for this is that the gas cannot flow into the exposed pixel spaces. Of those gases at the three positions, the two gases positioned upstream in the main scan direction are not subjected to the exposure operation in the sub-scan direction, and therefore those two gases still stagnate at the same positions.

Also in the second exposure operation, gas is generated sometimes. The gas generated is also driven to move to the unexposed part of the recording medium, although it is not illustrated.

(3) FIG. 20(*c*) shows an exposure state on the recording medium that the recording has reached a position of the 6th row in the main scan direction at the (M+1)-th rotation of the drum. With the progress of the exposure operation for the patterns of "2", the two gases located downstream in the sub-scan direction on the recording medium are driven to move to an unexposed part thereof located downstream in the sub-scan direction and upstream in the main scan direction, and those gases are combined to form a large mass of gas.

(4) FIG. 20(*d*) shows an exposure state on the recording medium that the recording has reached a position of the 10th row in the main scan direction at the (M+1)-th rotation of the drum. By the exposure operation recording a pattern of "2", the mass of gas has driven to move outside an area (defined by the lines Nos. 1 to 12 arrayed in the sub-scan direction) to be exposed at the m-th rotation of the drum.

(5) FIG. 20(*e*) shows an exposure state on the recording medium that the recording has reached a position of the 14th row in the main scan direction at the (M+1)th rotation of the drum. The mass of gas remains stagnating at the unexposed part of the recording medium. By the exposure operation of recording patterns of "2" in the sub-scan direction, of the already existing three gases, the gas located most upstream in the main scan direction is driven to move to an unexposed part located downstream in the sub-scan direction and upstream in the main scan direction.

(6) FIG. 20(*f*) shows an exposure state on the recording medium that the recording has reached a position of the 17th row in the main scan direction at the (M+2)-th rotation of the drum. By the exposure operation of recording patterns of "3" arrayed in the sub-scan direction, the mass of gas having stagnated in FIG. 20(*e*) is driven to move to an unexposed part located downstream in the sub-scan direction and upstream in the main scan direction. In this way, the gases generated in the exposure operation at the m-th rotation of the drum, are driven to move to the ends of the recording medium, and discharged outside from the ends of the recording medium.

When the exposure pattern is so configured and the exposure patterns are arrayed as mentioned above, as shown in FIG. 20(*f*), there is no chance that the gas stagnates between the toner layer 240*c* and the image receiving layer 140*c* in the recorded area, the close contact between the toner layer 240*c* and the image receiving layer 140*c* is maintained, and formation of the image defect based on the spot array is prevented.

The exposure method effectively operates when the dot area rate is 70% or higher, particularly for the solid part (where the dot area rate is 100%).

As described above, one of the features of the invention is that an array of unexposed pixels to be thinned out on the recording medium are directed to the downstream side as viewed in the sub-scan direction and the upstream side in the main scan direction. Where those pixels are arrayed in a direction opposite to that of the above-mentioned one, it is impossible to produce such useful effects produced.

Next, the "thin-out exposure process" of the invention will be described by taking a called "solid recording" as an example.

Figure 23:
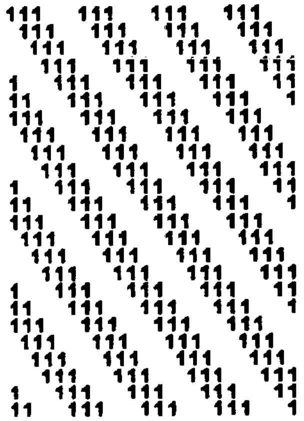
Figure 23:
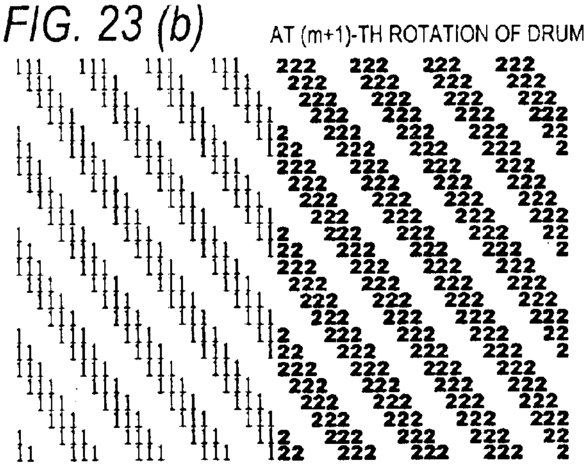
Figure 23:
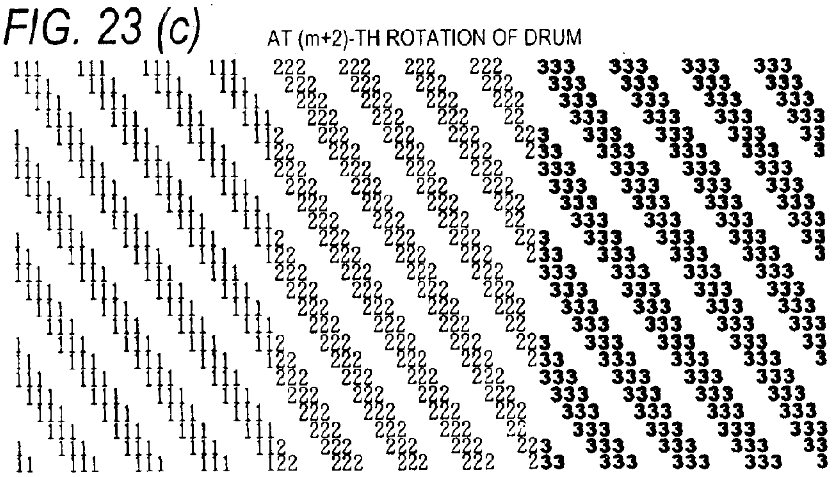

FIGS. 23(*a*), 23(*b*), 23(*c*), 24(*a*), 24(*b*), and 24(*c*) show a "thin-out exposure process" according to the sixth embodiment of this invention. A first exposure operation is performed in a thin-out manner, by moving the recording head to a position near the end of the sub-scan (FIGS. 23(*a*), 23(*b*), and 23(*c*)). Then, the recording head is returned to a position near the original position of the sub-scan, and an exposure operation is performed again, while forming inverted patterns (FIGS. 24(*a*), 24(*b*), and 24(*c*)).

(1) FIG. 23(*a*) shows an exposure state on the recorded recording medium fixed to the drum at the m-th rotation of the drum. In the figure, patterns of "1"s are exposed pixels recorded at the m-th rotation of the drum, and other white squares are unexposed pixels. Specifically, at the m-th rotation of the drum in the first exposure operation, an area defined by the lines Nos. 1 to 24 arrayed in the sub-scan direction are exposed in a thin-out manner by using the spots Nos. 1 to 24, to have patterns of "1" of FIG. 23(*a*).

As seen from figure, in the operation of exposing and recording the fist line at the m-th rotation of the drum (FIG. 23(*a*)) in the first exposure operation, the spots Nos. 1 to 24 (FIG. 5), the spots Nos. 24, 23, 22, 18, 17, 16, 12, 11, 10, 6, 5, 4 are driven to expose the pixels of the lines Nos. 1, 2, 3, 7, 8, 9, 13, 14, 15, 19, 20, 21 arrayed in the sub-scan direction In the exposure operation in which at the m-th rotation of the drum, the drum slightly rotates and the 2nd line is positioned under the spots Nos. 1 to 24, the spots Nos. 23, 22, 21, 17, 16, 15, 11, 10, 9, 5, 4, 3 of those spots Nos. 1 to 24 are driven to expose the pixels of the lines Nos. 2, 3, 4, 8, 9, 10, 14, 15, 16, 20, 21, 22 arrayed in the sub-scan direction.

Further, in the exposure operation in which at the m-th rotation of the drum, the drum slightly rotates and the 3rd line is positioned under the spots Nos. 1 to 24, the spots Nos. 22, 21, 20, 16, 15, 14, 10, 9, 8, 4, 3, 2 of those spots Nos. 1 to 24 are driven to expose the pixels of the lines Nos. 3, 4, 5, 9, 10, 11, 15, 16, 17, 21, 22, 23 arrayed in the sub-scan direction.

Subsequently, as the line number of the lines to be exposed at the same number of rotations of the drum increases, the spots to be driven are successively shifted in the sub-scan direction. With this, an array of pixels is to be thinned out is directed to the downstream side in the sub-scan direction and to the upstream side in the main scan direction.

In the above description, for ease of explanation, the recording head is not moved in the sub-scan direction during one rotation of the drum. Actually, however, the recording head is also moved in the sub-scan direction during one rotation of the drum. A relationship between the spots Nos. 1 to 24 and the line numbers of the lines arrayed in the sub-scan direction is shifted by an amount of the head movement to the sub-scan direction.

(2) Subsequently, at the (m+1)-th rotation of the drum in the first exposure operation, an area defined by the lines Nos. 25 to 48 arrayed in the sub-scan direction is exposed in a thin-out manner by using the spots Nos. 1 to 24, to have patterns of "2" of FIG. 23(*b*). The thinning-out manner is the same as of "1" of FIG. 23(*a*).

(3) Then, at the (m+2)-th rotation of the drum in the first exposure operation, an area defined by the lines Nos. 49 to 72 arrayed in the sub-scan direction are exposed in a thin-out manner by using the spots Nos. 1 to 24, to have patterns of "3" of FIG. 23(*c*). The thinning-out manner is the same as of "1" of FIG. 23(*a*). Subsequently, the recording head is moved to a position near the end position of the sub-scan, while repeating the sequence of exposure operations mentioned above, and the first exposure operation ends.

Figure 24:
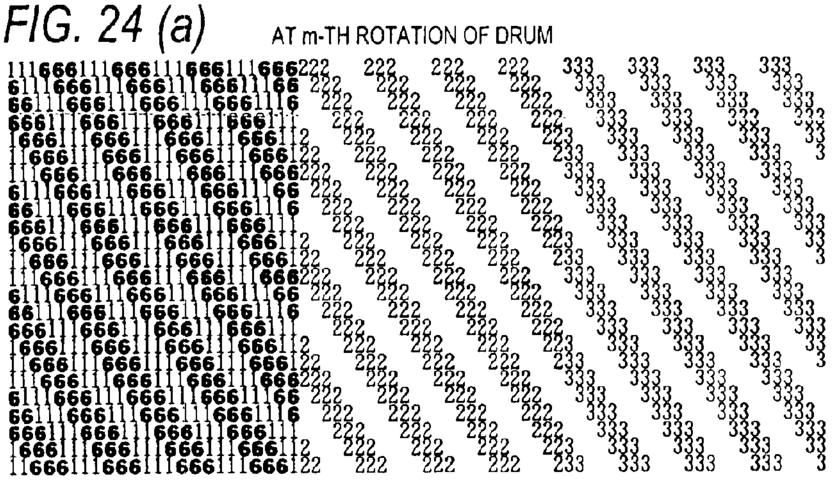
Figure 24:
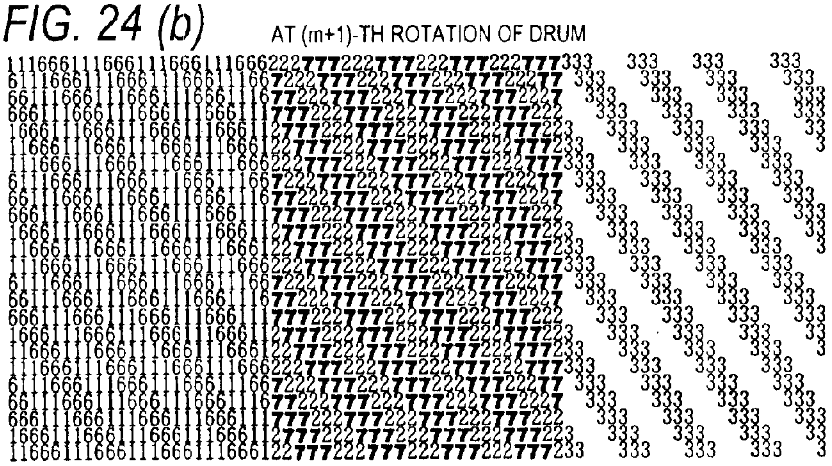
Figure 24:
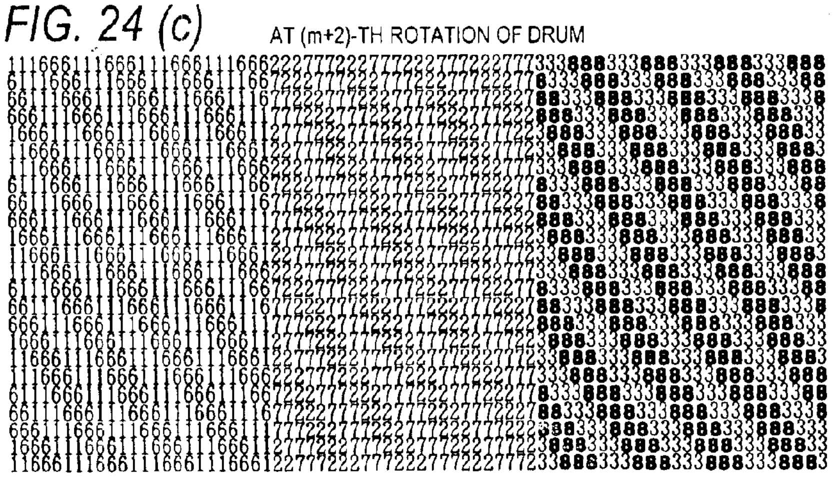

(4) After the first exposure operation (sub-scanning operation by the recording head) ends, the recording head is returned to the original position of the sub-scan, and the recording by the second exposure operation is performed as shown in FIGS. 24(*a*), 24(*b*), and 24(*c*).

In (FIG. 24(*a*), in the exposure of the 1st line at the m-th rotation of the drum, the spots Nos. 21, 20, 19, 15, 14, 13, 9, 8, 7, 3, 2, 1 of the spots Nos. 1 to 24 are driven to expose the pixels of the lines Nos. 4, 5, 6, 10, 11, 12, 16, 17, 18, 22, 23, 24 arrayed in the sub-scan direction, and the remaining part, which was thinned out in the first exposure operation, is exposed to have patterns of "6" in the figure.

(5) At the (m+1)-th rotation of the drum in the second exposure operation, as shown (FIG. 24(*b*)), an area defined by the lines Nos. 25 to 48 arrayed in the sub-scan direction, i.e., the remaining parts thinned out in the fist exposure operation, are exposed by using the spots Nos. 1 to 24, to have patterns of "7" in the figure.

(6) At the (m+2)-th rotation of the drum in the second exposure operation (FIG. 24(*c*)), an area defined by the lines Nos. 49 to 72 arrayed in the sub-scan direction, i.e., the remaining parts thinned out in the fist exposure operation, are exposed by using the spots Nos. 1 to 24, to have patterns of "8" in Thus, the laser energy is not concentrated to the sub-scan lines No. 1 to 24 at a dash, but the same lines arrayed in the sub-scan direction are exposed by plural exposure operations. Accordingly, the load by the heat of the recording medium is small.

Gas that is generated in the first exposure operation stagnates in the spaces of the thinned-out part of the recording medium. The gas that is generated in the second exposure operation and gas having been stagnated are both driven to move upstream in the main scan direction and downstream in the sub-scan direction with the progress of the exposure operation. Finally, those gases are discharged from the ends of the recording medium to exterior. As a result, there is no chance that the gas stagnates between the toner layer 240*c* and the image receiving layer 140*c* in the already recorded area, the close contact between the toner layer 240*c* and the image receiving layer 140*c* is maintained, and formation of the image defect resulting from the spot array is prevented. This will be described in detail in the description of the second embodiment of the invention.

In the first instance of the first embodiment, the description has made about a case where the "thin-out exposure process" is executed by two exposure operations, viz., the "thin-out exposure process" is executed by repeating the exposure operation two times, or the exposure operation for the "thin-out exposure process" is divided into two operations. However, it will readily be understood that the number of divisions of the exposure operation for the "thin-out exposure process" is not limited to 2, but may be 3 or larger.

Further, in the description, after the first exposure operation ends, the recording head is returned to a position near the original position in the sub-scan direction. In alternative, the recording head may perform the second exposure operation, while the recording head returns from the end position of the sub-scan direction to near the original position.

Figure 25:
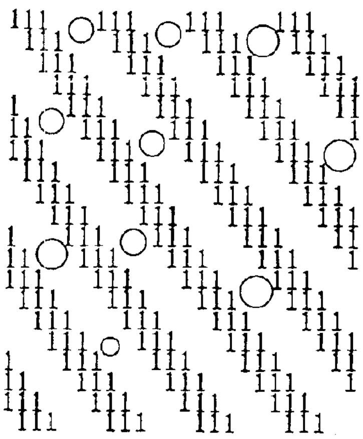
Figure 25:
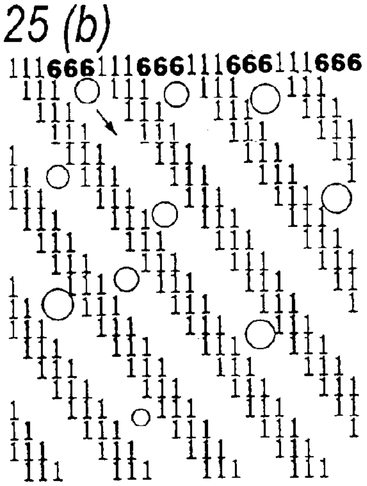
Figure 25:
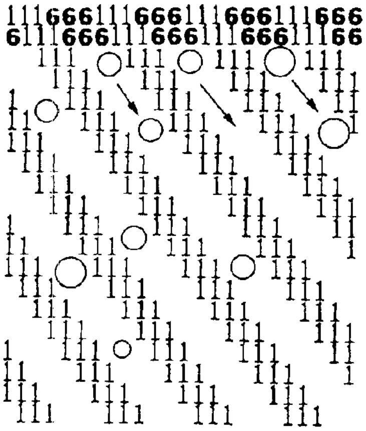
Figure 25:
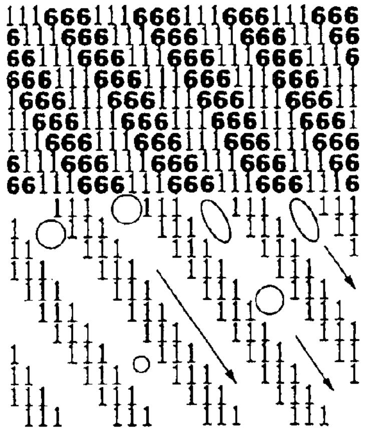
Figure 25:
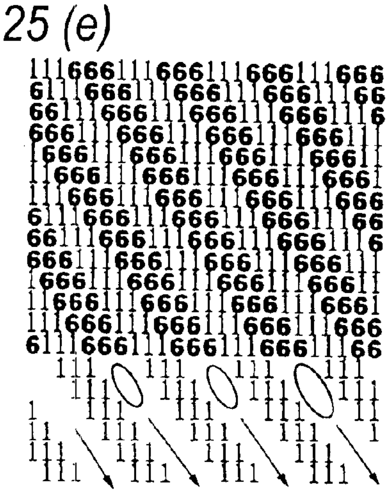
Figure 25:
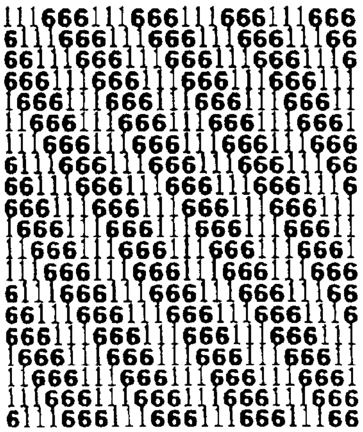

FIGS. 25(*a*), 25(*b*), 25(*c*), 25(*d*), 25(*e*) and 25(*f*) are diagrams useful in explaining the thinning-out direction in the "thin-out exposure process" of the second embodiment of the invention.

In the second embodiment of the invention, the recording apparatus 1 is characterized by that the exposure patterns are obliquely arranged.

As executed in the first embodiment, a pattern to record is slanted to the downstream side in the sub-scan direction and to the upstream side in the main scan direction.
By so slanting the patterns, the exposure operation is performed while driving the gas generated in the exposure operation to move downstream in the sub-scan direction.

Accordingly, the recording operation is performed with no gas stagnation and no density lowered part.

This specific example will be described with reference to FIGS. 25(*a*), 25(*b*), 25(*c*), 25(*d*), 25(*e*) and 25(*f*) showing a process in which after the first exposure operation (the sub-scanning operation by the recording head) ends, the recording head returns to a position near the original point of the sub-scan, and the recording by a second exposure operation is performed as shown in FIG. 24(*a*).

FIG. 25(*a*) shows a state on the recording medium before the second exposure operation starts. In the figure, gas (each denoted as a circle) that is generated in the recording of patterns of "1" in first exposure operation, stagnates in the unexposed part on the recording medium.

In FIG. 25(*b*), the 1st line in the unexposed part is exposed for recording by the second exposure operation. At this time, since the already existing gas (denoted as a circle) cannot flow into the exposed pixel spaces, it is moved in a direction of an arrow, i.e., to an unexposed part. Further, in FIG. 25(*c*), a position of the 2nd line in the main scan direction of the unexposed part is exposed by the second exposure operation. At this time, the already existing gas and gas generated in the second exposure operation are also moved to the unexposed part of the recording medium.

As the operation of exposing the lines in the unexposed part progresses, as shown in FIG. 25(*d*), the already existing gas and gas generated in the second exposure operation are likewise moved to the unexposed part located downstream in the sub-scan direction and upstream in the main scan direction.

And, in FIG. 25(*e*), the gas having been driven to move to the ends of the recording medium is discharged outside from the ends of the recording medium.

When the exposure pattern is so configured and the exposure patterns are arrayed as mentioned above, as shown in FIG. 25(*f*), there is no chance that the gas stagnates between the toner layer 240*c* and the image receiving layer 140*c* in the recorded area, the close contact between the toner layer 240*c* and the image receiving layer 140*c* is maintained, and formation of the image defect resulting from the spot array is prevented.

The exposure method effectively operates when the dot area rate is 70% or higher, particularly for the solid part (where the dot area rate is 100%).

Figure 26:
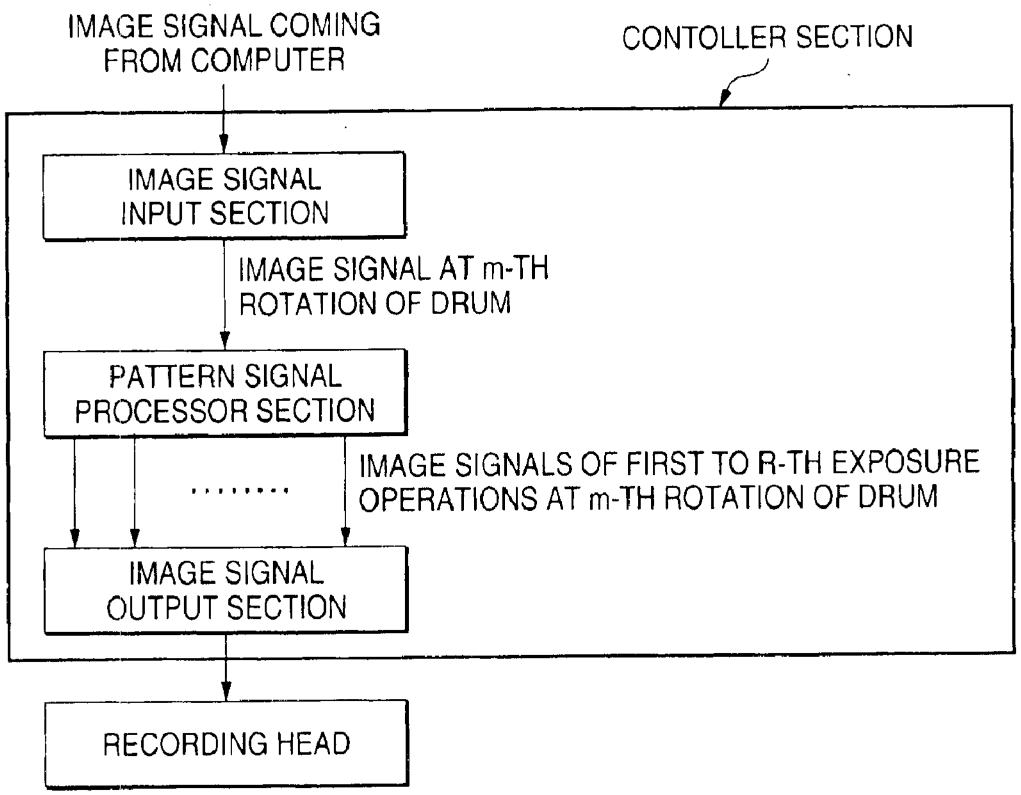
FIG. 26 is a block diagram showing a process in which an image signal coming from a computer is processed and an image signal to be applied to the recording head is generated, FIGS. 27(*a*), 27(*b*), and 27(*c*) are diagrams showing image data of the blocks in FIG. 26.

FIG. 26 is a block diagram showing a process in which an image signal coming from a computer is processed and an image signal to be applied to the recording head is generated.

1) An image signal coming from a computer is input to an image signal input section in the controller section. An image signal from the computer takes a form as shown in FIG. 27(*a*).
2) The image signal input section takes out an image signal of the m-th rotation of the drum from the image signal coming from the computer, and sends it to a pattern signal processor part.
3) The pattern signal processor part computes the image signals of the m-th rotation of the drum, and sends it to an image signal output section.
4) The image signal output section drives the recording head for exposure in accordance with the incoming image signals.

Figure 27:
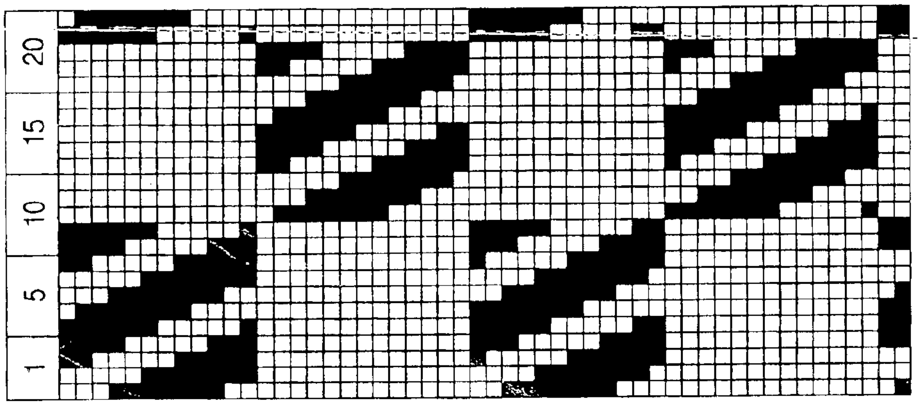
Figure 27:
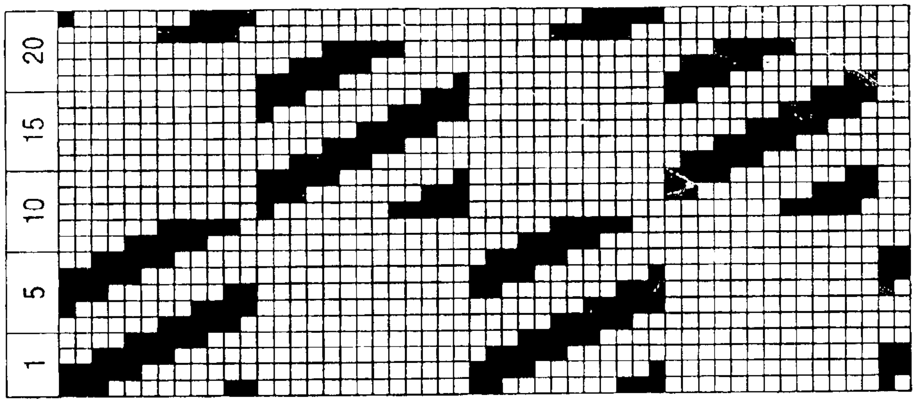
Figure 27:
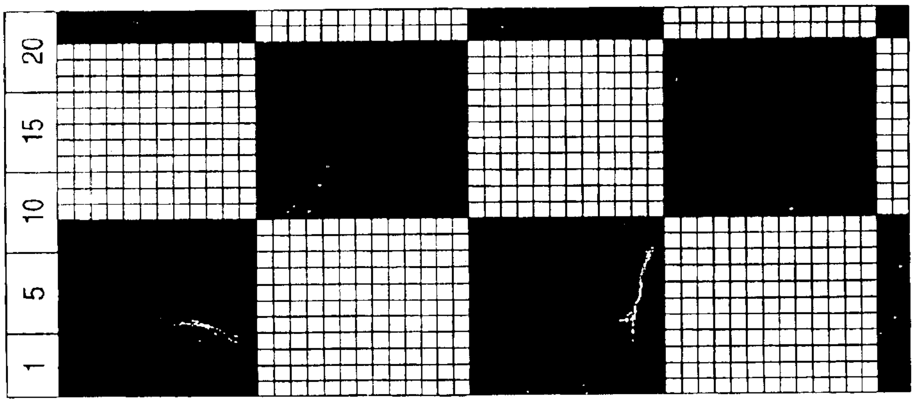

FIGS. 27(*b*) and 27(*c*) are diagrams showing a process in which the image signal as shown in FIG. 27(*a*) is exposed in a thin-out manner and recorded according to the invention. FIG. 27(*b*) shows positions (in the area defined by lines Nos. 1 to 24 in the sub-scan direction) on the recording medium to be recorded by the first exposure operation. As seen, the recording medium is exposed in thin-out patterns, which are slanted to the downstream side in the sub-scan direction and to the upstream side in the main scan direction.

FIG. 27(*c*) shows positions (in the area defined by lines Nos. 1 to 24 in the sub-scan direction) on the recording medium to be recorded by the second exposure operation. This is for exposing the thinned-out, unexposed part thinned in FIG. 27(*b*), and is a pattern slanted to the downstream side in the sub-scan direction and to the upstream side in the main scan direction.

As the result of performing the first and second exposure operations, the energy is dispersed, and the gas is driven to move outside the recording medium, so that the solid recording is performed while being free from the image defect.

In the embodiments mentioned above, the recording medium fixing member of the outer drum type is presented by way of example. It may be of the inner drum type in which the recording medium is fixed to the incurved surface or the inner peripheral surface of a cylinder, and a laser beam is emitted, for recording, from the center of incurved surface or the cylinder. A recording device of the type in which a laser beam is moved in the main scan direction, and the recording medium is transported in the sub-scan direction by means of a transporting mechanism, may also be used instead of the drum. The recording medium fixing member may be of the flat table type in which it is movable in the main scan direction. While the laser light spots one dimensionally arrayed are used in the embodiments, the laser beam spots two dimensionally arrayed may also be used instead.

As seen from the foregoing description, in an image recording method and apparatus of the invention, in a first exposure operation in which the recording head is moved from the position near the original point of the sub-scan to the position near the end point of the sub-scan, image/character data is exposed in a thin-out manner, and in a second exposure operation and the subsequent ones, the pixels in the thinned-out, unexposed part are successively exposed. Therefore, gas generated at a local part or area of the recording medium is moved to the downstream in the sub-scan direction and the upstream side in the main scan direction, with movement of the recording head. The gas is forced to flow to the unexposed part or area, and finally discharged outside the recording medium. As a result, the gas stagnation between the toner layer and the image receiving layer at the already recorded area or part is prevented.

What is claimed is:

1. An image recording method executed by a recording apparatus including a recording medium fixing member for fixing a recording medium formed by coupling together a toner layer of a transfer film as a heat mode sensitive material and an image receiving layer of a receiver film in a layering manner and having a plurality of spots arrayed on a surface thereof, and a recording head capable of irradiating for exposing the recording medium, the method comprising the steps of:

recording for recording a desired image on the recording medium by the recording head exposing the recording medium along image/character data with letting the recording medium relatively move in a main scan direction between the recording medium fixing member and the recording head as well as letting the spots relatively move in a sub-scan direction;

first exposing for exposing pixels on the recording medium in the sub-scan direction by relatively moving the recording head from a position near the original point of the sub-scan to a position near the end of the sub-scan;

second exposing for exposing pixels in an unexposed area; and repeating the step of second exposing for exposing remaining pixels;

wherein the main scan direction is a relative moving direction of recording medium and the recording head toward to a predetermined direction, wherein the sub-scan direction is orthogonal to the main scan direction, wherein the pixels in the step of first exposing, correspond to image/character data on the recording medium and are exposed by moving the recording head so that the pixels form island patterns, and wherein the island pattern includes a predetermined number of pixels consecutively arrayed on the recording medium in the main and sub-scan directions.

2. An image recording apparatus comprising:

a recording medium fixing member for fixing a recording medium formed by coupling together a toner layer of a transfer film as a heat mode sensitive material and an image receiving layer of a receiver film in a layering manner and having a plurality of spots arrayed on a surface of the recording medium;

a recording head capable of irradiating for recording a desired image on the recording medium by exposing along image/character data with moving relative to the recording medium in a main scan direction, at the same time the plurality of spots are moving in sub-scan direction orthogonal to the main scan direction, performing a first exposure operation for exposing pixels on the recording medium by moving in the sub-scan direction, performing a second exposing operation for exposing pixels of unexposed area on the recording medium, and repeating the second exposing operation; and an exposure controller device for controlling the recording head so that, in the first exposure operation, pixels corresponding to information of image/character data on the recording medium are exposed so that the pixels form an island pattern, and in a second exposure operation and the subsequent ones, the pixels in an unexposed area other than the island patterns on the recording medium are successively exposed to the light;

wherein the island pattern is a group of a predetermined number of pixels continuously exposed in the main scan direction and the sub-scan direction during the first exposure operation.

3. The image recording apparatus according to claim 2, wherein, in the second exposure operation, after the recording head reaches a position near the end of the sub-scan and returns to a position near the original point of the sub-scan in the first exposure operation, the pixels in the unexposed area not having been exposed in the preceding exposure operation are exposed R times, wherein R is an optional positive integer.

4. The image recording apparatus according to claim 2, wherein, in the second exposure operation, after the recording head reaches the position near the end of the sub-scan in the first exposure operation, the recording head returns to the position near the original point of the sub-scan while exposing the pixels in the unexposed area not having been exposed in the preceding exposure operation.

5. The image recording apparatus according to claim 2, wherein, at an R-th exposure by the recording head, the recording head may expose the remaining image/character data other than the image/character data having been exposed in the first to an (R−1)th exposure operations, and wherein R is a positive integer.

6. The image recording apparatus according to claim 2, wherein, at the first exposure, a percentage of the island patterns to the whole image/character data to be exposed is 20% to 80%.

7. The image recording apparatus according to claim 2, wherein at an R-th exposure operation, a percentage of the image/character data other than the image/character data having been exposed in the first to an (R−1)th exposure operations, to the whole image/character data to be exposed is 20% or higher, and wherein R is a positive integer.

8. An image recording method executed by a recording apparatus including a recording medium fixing member for fixing a recording medium formed by coupling together a toner layer of a transfer film as a heat mode sensitive material and an image receiving layer of a receiver film in a layering manner and having a plurality of spots on a surface thereof, and a recording head capable of irradiating the recording medium, the method comprising the steps of:

recording for recording a desired image on the recording medium by the recording head exposing the recording medium along image/character data with letting the recording medium relatively move in a main scan direction between the recording medium fixing member and the recording head as well as letting the spots relatively move in a sub-scan direction;

first exposing for exposing pixels on the recording medium in the sub-scan direction by relatively moving the recording head from a position near the original point of the sub-scan to a position near the end of the sub-scan;

second exposing for exposing pixels in an unexposed area; and repeating the step of second exposing for exposing remaining pixels;

wherein the pixels in the step of first exposing, are corresponding to image/character data on the recording medium, and are exposed by moving the recording head from a position near the original point of the sub-scan to a position near the end of the sub-scan so that the pixels form an island pattern after dividing the plurality of spots into a "n" number of blocks, wherein, in the steps of second exposing and repeating, the pixels in an unexposed area other than the island patterns on the recording medium are gradually exposed by using the 2nd to (n−1)th blocks of spots and the remaining pixels in the unexposed area are exposed by the n-th block of spots, wherein the island pattern includes a predetermined number of pixels consecutively arrayed on the recording medium in the main and sub-scan directions, wherein n is an optional positive integer of 2 or larger.

9. An image recording apparatus comprising:

a recording medium fixing member for fixing a recording medium formed by coupling together a toner layer of a transfer film as a heat mode sensitive material and an image receiving layer of a receiver film in a layering manner and having a plurality of spots arrayed on a surface of the recording medium;

a recording head capable of irradiating for recording a desired image on the recording medium by exposing along image/character data with moving relative to the recording medium in a main scan direction, at the same time the plurality of spots are moving in sub-scan direction orthogonal to the main scan direction, performing a first exposure operation for exposing pixels on the recording medium by moving in the sub-scan direction, performing a second exposing operation for exposing pixels of unexposed area on the recording medium, and repeating the second exposing operation; and an exposure controller device for dividing the spots into an "n" umber of blocks, and controlling the recording head so that, in a first block exposure operation, pixels corresponding to information of image/character data on the recording medium are exposed by using the spots of a first block so that the pixels form an island pattern, and in a second block exposure operation and the subsequent ones, the pixels in an unexposed area other than the island patterns on the recording medium are gradually exposed by using the 2nd to (n−1)th blocks of spots, and the remaining pixels in the unexposed area are exposed by the n-th block of spots;

wherein the island pattern is a group of a predetermined number of pixels continuously exposed in the main scan direction and the sub-scan direction during the first exposure operation, and wherein n is an optional positive integer of 2 or larger.

10. The image recording apparatus according to claim 9, wherein a percentage of an unexposed part at the exposure by the first block of spots to the whole image/character data to be exposed is 20% to 80%.

11. The image recording apparatus according to claim 9, wherein a percentage of image/character data other than that exposed by the 1st to (n−1)th blocks of spots at the exposure by the n-th block of spots, to the whole image/character data to be exposed is 20% or higher.

* * * * *